(12) United States Patent
LeSuer et al.

(10) Patent No.: US 8,776,023 B2
(45) Date of Patent: Jul. 8, 2014

(54) SOFTWARE TESTING

(76) Inventors: Brian J. LeSuer, Hopkinton, MA (US); David C. Laroche, North Hampton, NH (US)

( * ) Notice: Subject to any disclaimer, the term of this patent is extended or adjusted under 35 U.S.C. 154(b) by 163 days.

(21) Appl. No.: 13/382,875

(22) PCT Filed: Jul. 6, 2010

(86) PCT No.: PCT/US2010/001910
§ 371 (c)(1),
(2), (4) Date: Aug. 30, 2012

(87) PCT Pub. No.: WO2011/005312
PCT Pub. Date: Jan. 13, 2011

(65) Prior Publication Data
US 2013/0117731 A1    May 9, 2013

Related U.S. Application Data

(60) Provisional application No. 61/270,057, filed on Jul. 6, 2009.

(51) Int. Cl.
*G06F 9/44* (2006.01)
*G06F 11/00* (2006.01)

(52) U.S. Cl.
USPC ............................ 717/124; 717/131; 714/25

(58) Field of Classification Search
USPC ............................ 717/124, 125, 131; 714/25
See application file for complete search history.

(56) References Cited

U.S. PATENT DOCUMENTS

| | | | |
|---|---|---|---|
| 7,055,130 B2* | 5/2006 | Charisius et al. | 717/108 |
| 8,126,766 B2* | 2/2012 | Alexander | 705/7.32 |
| 2006/0085681 A1 | 4/2006 | Feldstein | |
| 2007/0022407 A1* | 1/2007 | Givoni et al. | 717/124 |
| 2008/0127101 A1* | 5/2008 | Anafi et al. | 717/125 |
| 2009/0037881 A1* | 2/2009 | Christy et al. | 717/124 |
| 2009/0077422 A1 | 3/2009 | Khaladkar | |
| 2009/0320002 A1* | 12/2009 | Peri-Glass et al. | 717/131 |

FOREIGN PATENT DOCUMENTS

WO  PCT/US2010/001910    1/2012

OTHER PUBLICATIONS

Goff, "Measurement of colloid mobility by laser doppler electrophoresis: the effect of salt concentration on particle mobility", Journal of Colloid and Interface Science, Jun. 1, 1984, pp. 468-483, vol. 99, No. 2, Academic Press, New York, NY, US.

* cited by examiner

*Primary Examiner* — Don Wong
*Assistant Examiner* — Mohammad Kabir
(74) *Attorney, Agent, or Firm* — Kristofer E. Elbing

(57) ABSTRACT

In one general aspect, a computer-based software testing method is disclosed that includes presenting to a user an interactive visual user interface of an application under test that includes a plurality of user interface controls, with each of the presented user interface controls having a predefined native interaction mode. The method also includes intercepting normative pointing-device-based user interaction with each of a plurality of the user interface controls, with the normative pointing-device-based user interaction mode being different from the native interaction mode. Interface definitions are built for the application based on results of the steps of intercepting for the plurality of interface controls.

43 Claims, 47 Drawing Sheets

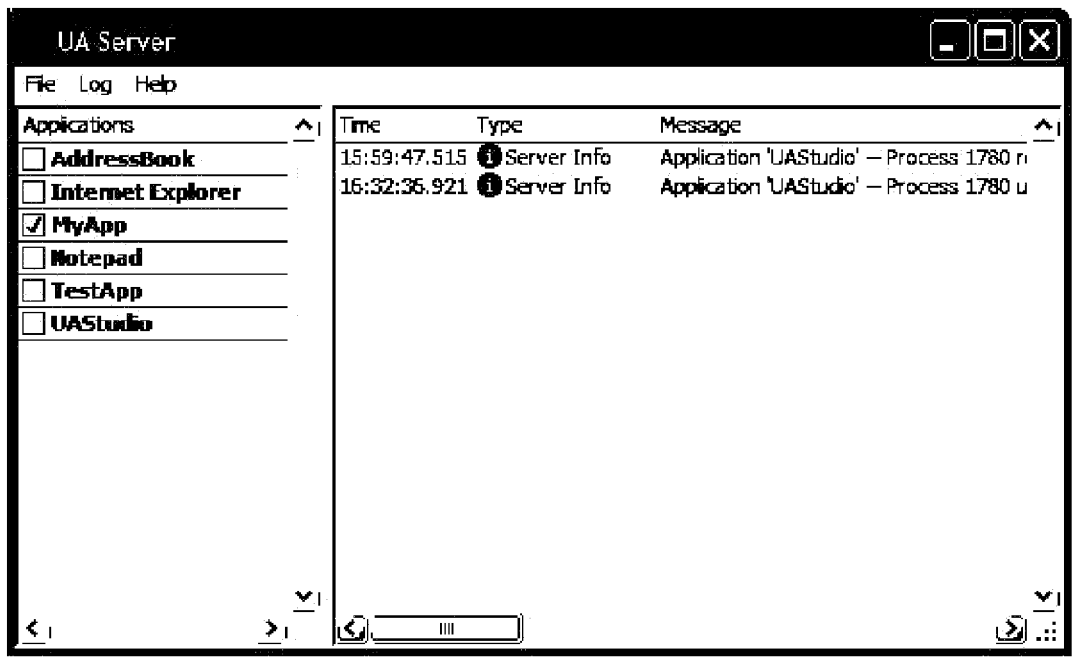
FIG. 9
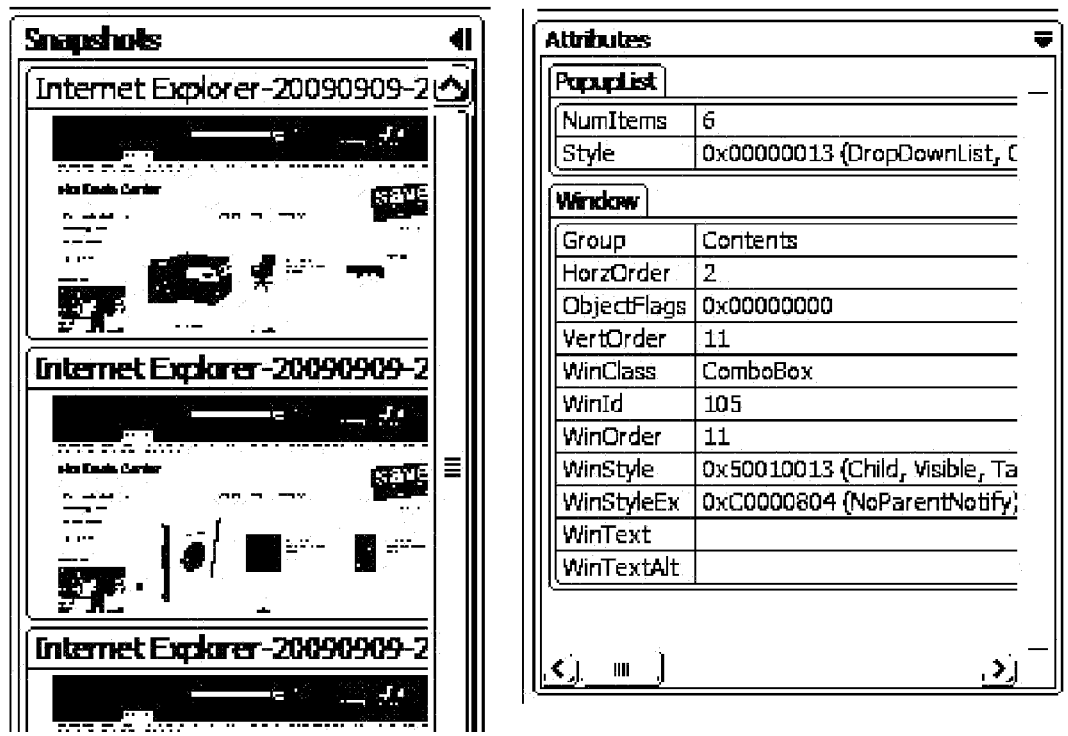
FIG. 10
FIG. 12

| Customer Number | Items | | | | Payments | | | Credit Card Info | | |
| --- | --- | --- | --- | --- | --- | --- | --- | --- | --- | --- |
| | SKU | Quantity | Price Override | | Type | Amount | Number | Type | Expire Month | Expire Year |
| 1 39120 | | | | | | | | | | |
| | 1 355323 | 1 | 34.99 | | 1 Cash | 20 | | | | |
| | 2 442092 | 5 | 11.44 | | 2 CreditCard | 14.99 | 4949242009952525 | Visa | 09 | 2011 |
| | 3 119414 | 2 | | | | | | | | |
| 2 39120 | | | | | | | | | | |
| | 1 355323 | 1 | 34.99 | | 1 Cash | 20 | | | | |
| | 2 442092 | 5 | 11.44 | | 2 CreditCard | 14.99 | 4949242009952525 | Visa | 09 | 2011 |
| | 3 119414 | 2 | | | | | | | | |

FIG. 83

SOFTWARE TESTING

CROSS-REFERENCE TO RELATED APPLICATION

This application claims the benefit of U.S. Provisional Application No. 61/270,057, filed Jul. 6, 2009, which is herein incorporated by reference.

FIELD OF THE INVENTION

This invention relates to methods and apparatus for testing software.

BACKGROUND OF THE INVENTION

Automated testing tools for software applications have been offered commercially since the late 1970s. Users of these tools can write scripts that provide them with instructions to simulate user actions including computer mouse movements and keyboard presses. Automated testing tools can also be programmed to capture values and state information from the application under test so that these values can be compared to benchmarks and used to ascertain whether the application under test is performing according to specification.

Existing tools allow users to create scripts via manual coding and recording. Manual coding involves writing instructions in a scripting language. Recorders are software programs that monitor and capture user activity including mouse movements and keyboard presses. Although recorders provide ease of use over manual coding, they can produce scripts that do not work reliably and are difficult to maintain.

To make the process of writing manual code simpler, it is known to use an automated software tool to recognize and classify graphical user interface (GUI) objects in an application under test (AUT). This can be accomplished, for example, by monitoring communications between the AUT and the operating system. Once a GUI object, such as a checkbox, list box, or table, is recognized, suitable tests for that object can be developed.

Assembling a complete set of coded tests for an application, such as website, and maintaining those tests as the website is updated can be a sizable undertaking, and can require the efforts of a number of highly skilled test employees. Moreover, once the development of an application or an update approaches completion and the application is fully available for testing, there is often tremendous organizational pressure to release it to end users. Improvements to the tools and processes used to generate software tests can therefore allow applications to be tested and released more quickly, and can help to lower test development costs.

SUMMARY OF THE INVENTION

In one general aspect, the invention features a computer-based software testing method that includes presenting to a user an interactive visual user interface of an application under test that includes a plurality of user interface controls, with each of the presented user interface controls having a predefined native interaction mode. The method also includes intercepting nonnative pointing-device-based user interaction with each of a plurality of the user interface controls, with the nonnative pointing-device-based user interaction mode being different from the native interaction mode. Interface definitions are built for the application based on results of the steps of intercepting for the plurality of interface controls.

In preferred embodiments the step of building can include building an object definition set that includes definitions for objects underlying the plurality of user interface controls. The method can further include a step of converting the object definition set to a predefined test format for a testing application. The method can further include a step of presenting to the user a class definition control that is responsive to user input to create object classes for classifying object definitions underlying the plurality of user interface controls. The method can further include a step of detecting duplicate user interface object nomenclature within the objects underlying the user interface controls presented in the step of presenting. The method can further include a step of presenting to the user a hierarchical object definition view that presents object definitions that underlie at least some of the user interface controls and presents relationships between the objects in the hierarchical object-definition view. The method can further include presenting attributes of selected objects in the hierarchical object definition view. The method can further include a step of presenting a hierarchical user interface control view that lists at least some of the user interface controls presented in the step of presenting an interactive user interface and presents relationships between the controls in the hierarchical user interface control view. The step of building can include building at least one data schema for the application under test. The method can further include a step of presenting to the user a schema-based visual data organization tool that is populated with at least some object attributes acquired from the application under test. The step of presenting to the user a schema-based visual data organization tool can provide a selection interface to select one or more of the acquired object attributes for a test case. The step of building can include binding entries in the schema to entries in the object definition list. The method can further include a step of taking a snapshot of the application in response to user input, with the step of presenting a visual interface presenting at least part of the application snapshot, and with the snapshot including the interactive visual interface presented in the step of presenting, at least a partial control set, and at least a partial set of attributes for the application. The method can further include presenting a set of paths for objects underlying the user interface controls selected by the user interaction with the user interface controls. The method can further include providing a path editor operative to allow user modification of the paths. The path editor can be operative to create nested Boolean path statements. The step of presenting a set of paths can include presenting the set of paths as part of a hierarchical object view that presents definitions for objects that underlie the plurality of user interface controls. The method can further include a step of automatically extracting object definitions from the application under test and presenting to the user an organized set of object definitions for the application under test. The steps of presenting a visual user interface and presenting an organized set of object definitions can present their results simultaneously in different display areas. The method can further include a step of presenting visual cues between user interface controls presented in the step of presenting an interactive visual user interface and object definitions presented in the organized set. The step of intercepting can intercept drag-and-drop interactions with the controls. The method can further include a step of automatically testing results of the step of intercepting for different types of controls based on different predetermined rules. The step of testing can include providing a measure of path quality to the user. The method can further include a step of providing selectors to the user for accessing sub-controls of list-based controls. The step of providing selectors can provide selectors that are operative to access cells of table controls. The object definitions can each include at least a token that uniquely identifies the object, with the nonnative interaction mode differing from the native interaction mode by virtue of the user interface elements being deactivated in the step of presenting. The step of intercepting can intercept selections of a group of controls and wherein the step of building builds a logical object comprising the selected controls in the group.

In another general aspect, the invention features a software testing system that includes an application under test user interface presentation area for visually presenting a user interface of an application under test that includes a plurality of user interface controls, with each of the presented user interface controls including a native interaction mode. The method further includes interactive control logic responsive to non-native pointing-device-based user interaction with each of a plurality of the user interface controls, with the nonnative interaction mode being different from the native interaction mode, and an interface definition authoring area that is also responsive to the nonnative pointing-device-based user interaction to define associations between the user interface controls and interface definitions.

In a further general aspect, the invention features a computer-based software testing method that includes presenting to a user a plurality of user interface controls for an application under test, wherein the step of presenting presents one or more list-based interface controls that each include a plurality of sub-controls, receiving a selector definition identifying one of the list-based user interface controls, and defining a selector, based on the received selector definition, that relates selection input to one of the sub-controls of the identified list-based interface control.

In preferred embodiments the step of defining can define a selector that is responsive to the selection input in the form of a search string and is operative to search for the search string in sub-controls in the identified list-based interface control during a test of the application under test. The step of defining can define a selector that is responsive to the selection input in the form of an index and is operative to locate a sub-control of the identified list-based interface control during a test of the application under test using the index.

In another general aspect, the invention features a computer-based software testing method that includes presenting to a user a plurality of user interface controls for an application under test, building interface definitions for at least some of the interface controls, receiving a group selection identifying a plurality of the user interface controls, and defining a logical object definition that groups definitions for the selected plurality of user interface controls.

In preferred embodiments, the logical object definition can be structured to allow selection of one of the grouped user interface control definitions via an index. The logical object definition can be structured to allow selection of one of the grouped user interface control definitions via a search string.

Systems according to the invention can be advantageous in that they can allow users to quickly and intuitively develop a framework for writing software tests. Using a pointing device to interact with a snapshot of an application in a nonnative mode enables users to intuitively navigate through the objects that underlie the GUI features of the application. This can allow them to quickly develop and perfect a corresponding set of object definitions for use by the testing system.

Systems according to the invention can also be advantageous in that they can greatly improve the ability to update tests for an application. Because the users are able to interact directly with the changed parts of a user interface, they can quickly understand how to update object definitions even if they were not the original authors of the definitions. And optimizations that were developed earlier for unchanged parts of the application can be left alone.

BRIEF DESCRIPTION OF THE DRAWING

FIGS. 3-83 are screen shots for the UA studio application illustrating various aspects of its operation as presented in the accompanying text.

DETAILED DESCRIPTION OF AN
ILLUSTRATIVE EMBODIMENT

Figure 1:
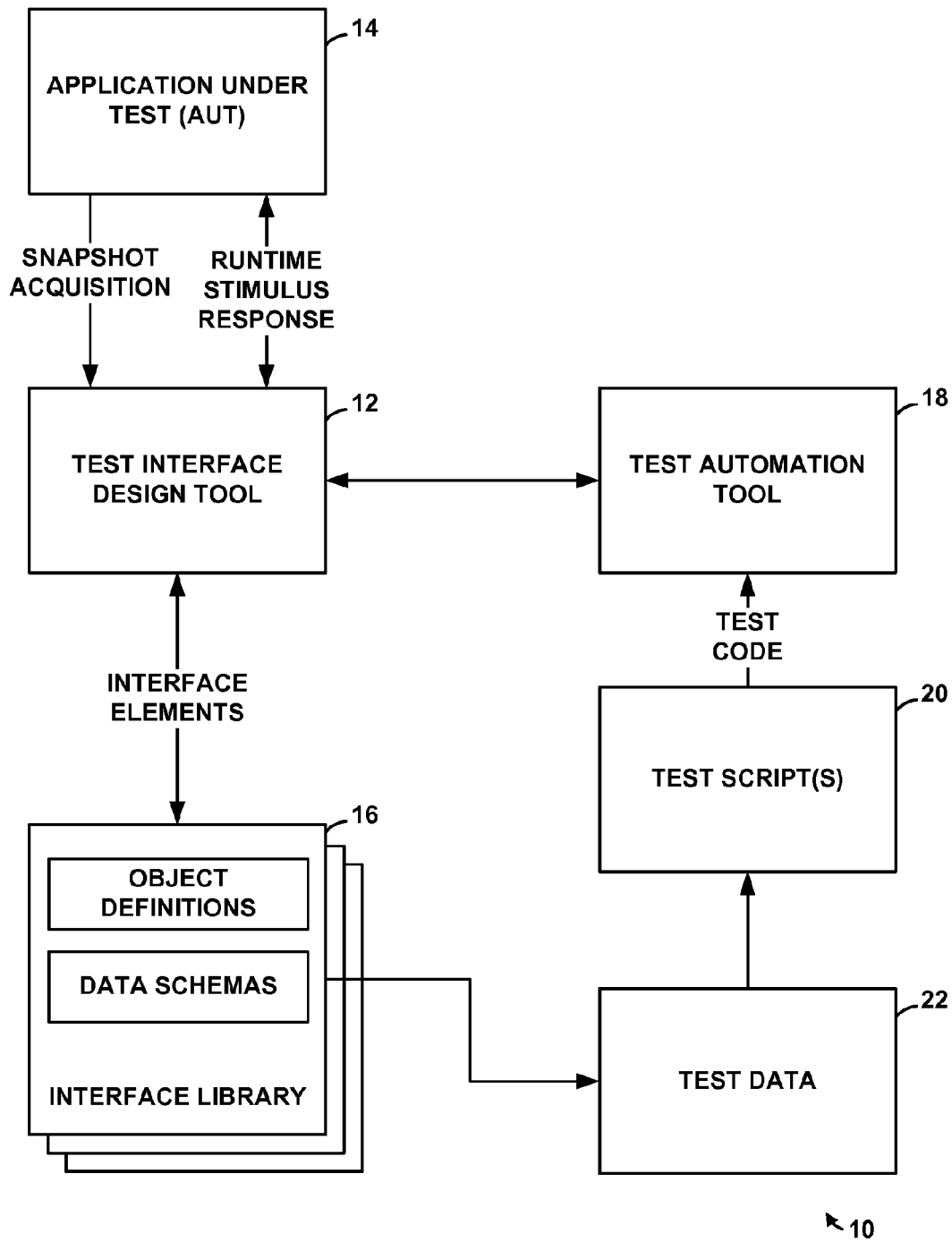
FIG. 1 is a block diagram of a software testing environment incorporating features of the invention.

Referring to FIG. 1, an illustrative software testing environment according to the invention 10 includes a test interface design tool 12 that is called the universal agent (UA). It interfaces with an AUT 14 and extracts information from it to provide interface elements, such as object definitions and data schemas, to an interface library 16. A test automation tool 18 can then access the interface elements in the interface library to enable test scripts 20 and test data 22 to be written for and run against the appropriate parts of the AUT. The test interface design tool can be designed to provide different types of interface libraries to enable it to operate with different automation test tools.

The system 10 can operate on one or more computer workstations that each include a processor, storage, a display, and one or more input devices, such as a keyboard and a pointing device (e.g., a mouse, touch-screen, or trackball). The workstation in this embodiment conforms to the so-called IBM-PC standard and is equipped with the well-known Microsoft Windows® operating system that enables its user to launch one or more application programs, although the system could also use other software platforms, such as Linux®, or UNIX®-based platforms. Other types of hardware platforms could also be supported, such as PDA's or mobile telephones.

The illustrative system has been implemented using a special-purpose software program running on a general-purpose computer platform, but it could also be implemented in whole or in part using special-purpose hardware. In addition, while the system can be broken into the series of modules shown in FIG. 1, one of ordinary skill in the art would recognize that it is also possible to combine them and/or split them to achieve a different breakdown. And while the description of the illustrative system shows a particular set of specific screen shots, there are many other ways that a workable system could be developed.

The universal agent is a tool-neutral, automated software testing component designed to describe a graphically rendered software application and its objects such as Button, EditBox, and ListBox in an XML format that can be translated to a language and format employed by a commercial testing tool. The UA controls all interactions between the application under test and the test automation tool through a generated interface library. The UA architecture is centered around a snapshot (described below), which contains an image of the application and its internal state at a given point in time. At test creation time, the user takes a snapshot of the AUT and interacts with controls presented by the AUT snapshot to build object definitions to describe the objects underlying the controls with which automated tests will interact. During runtime, the UA takes one or more snapshots of the AUT to perform each action requested by an automated test described in the scripting language of the user's choosing. Controls to be tested can include interactive controls, such as buttons or listboxes, and passive controls, such as textboxes.

The illustrative universal agent preferably includes the following primary features:

1. The UA is independent of the scripting language and test automation tool.
2. All interaction between the AUT and test automation tool is governed by the UA.
3. A logical model of the AUT is developed in the UA.
4. The UA generates an interface library for the test automation tool in use. This library is created in the language and format most appropriate for a target automation tool.
5. The UA provides a means of converting declarations from commercial testing tool format to UA format.
6. The interface library defines which objects can be observed and manipulated.
7. Interface libraries can be generated in many different languages (4Test, java, c#, etc.) using different component technologies (Dotnet, COM, etc).

Figure 2:
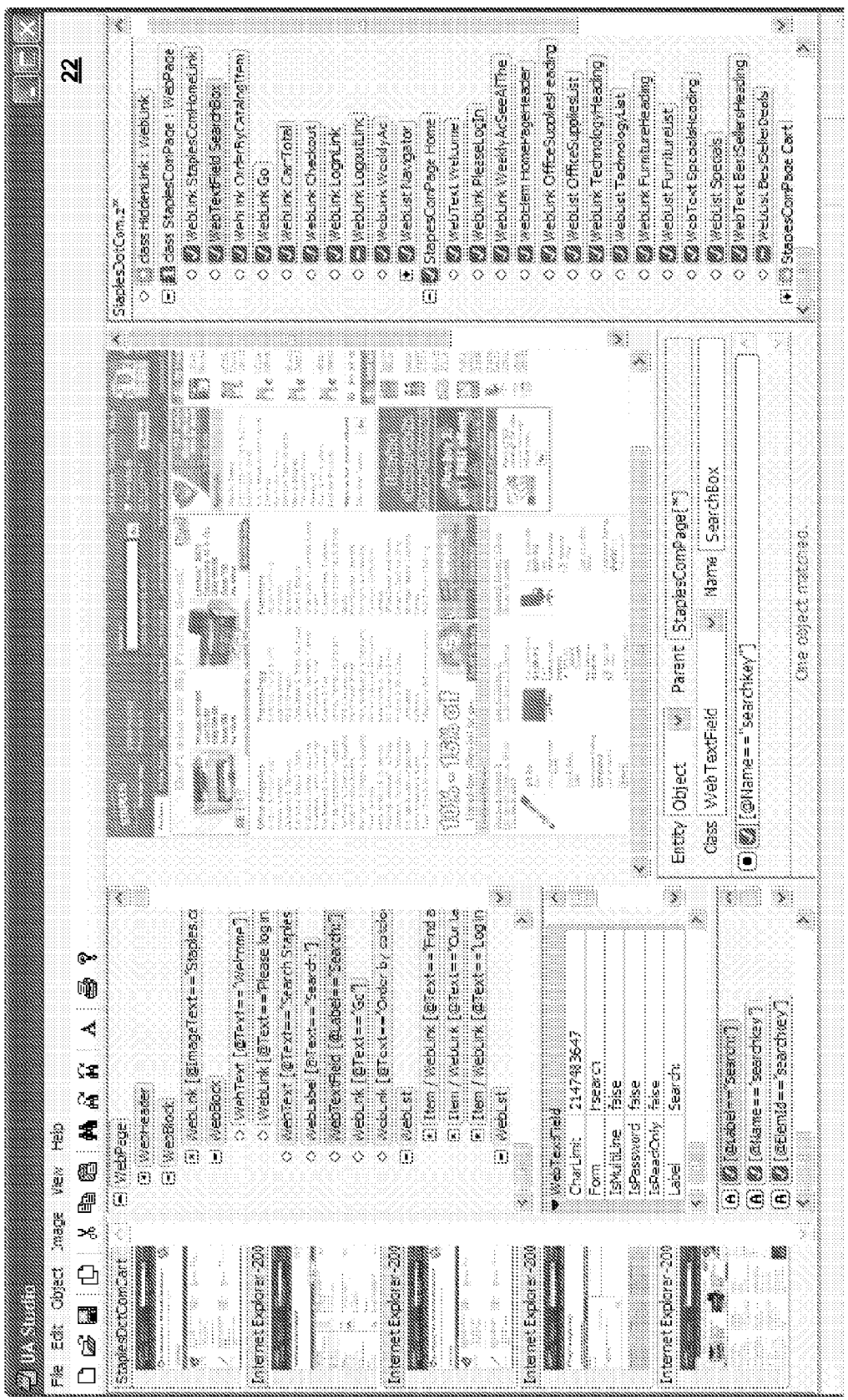
FIG. 2 is a screen shot of a snapshot viewer for use in the testing environment of FIG. 1.

Referring to FIG. 2, the UA provides a snapshot viewer 30. This is a tool that allows the user to build object definitions for automated testing using an image, object tree, and set of attributes captured for each application object. The tool allows the user to edit and maintain the object definition by interacting with the snapshot via point, click and drag operations. The snapshot viewer contains 7 panes. The pane on the far left is a navigator that displays thumbnails for each of the snapshots opened in the viewer. The right middle upper pane contains a larger image that interacts with the other panes. The upper left middle pane contains a tree that represents the physical hierarchy of application objects. This tree, shaded mainly in blue, traces the relationships of the objects on the screen or page captured in the snapshot and displays the class of each object. For some classes, an attribute is displayed to help identify the object. The pane on the far right contains the logical object definitions used in developing automated tests. The two lower middle panes are used to create a unique description for each application object using sets of attributes.

When the user clicks an object in the image, all of the panes display and, where applicable, highlight the selected object. The middle window in the left middle pane displays the attributes for that object. The two lower middle panes display 'paths' that can be used to identify the selected object for automated testing.

The illustrative snapshot viewer preferably includes the following primary features:

1. Capture application image, object tree and set of attributes for each application object in a file called a snapshot. All application elements and attributes are described internally in XML.
2. A snapshot contains both an image of how the application looked at a specific instant in time as well as the internal state of all aspects of the user interface.
3. Application objects in the image are linked to the object hierarchy.
4. Clicking on the application object in the physical object tree causes the object in the image to highlight. Clicking on the object in the image causes all of the panes to display and, where applicable, highlight the selected object.
5. The snapshot is used offline during design time to develop object definitions for automated testing and during runtime to interact with the AUT.
6. At design time, a series of snapshots can be used to develop and test the interface to the target application in different application contexts.
7. Allows the user to create object definitions for automated testing by interacting with the image.
8. Allows the user to select any combination of attributes to uniquely identify application objects for automated testing.
9. Presents the user with choices for identifying the application objects for automated testing. Each choice is given a confidence rating to help the user decide on the best path(s) to uniquely describe application objects.
10. Provides the user with feedback regarding the validity and uniqueness of the object definition. Once the user has selected a set of attributes that uniquely identifies the object, the object highlights in the application image.
11. Allows the user to test object definitions against multiple snapshots which represent the screen, page or window in different states or contexts.
12. Provides a means of displaying the differences between two snapshots to allow the user to merge or update snapshots.
13. During runtime, UA Server takes one or more snapshots to perform the requested action against the AUT or to return information about the application.
14. When an action cannot be performed, UA Server saves the current snapshot to a file for later inspection to help assist in determining the cause of the error.
15. Provides a mechanism for the user to define a data record for automated testing by interacting with the image. The data record will capture possible values for selector based controls such as list box or popup list and Boolean controls such as check box.
16. Provides a mechanism for the user to define an input method for automated testing by interacting with the image eliminating the need to write code or record test scripts.
17. Provides a mechanism for the user to define an invoke method for the application page, screen or window displayed image eliminating the need to write code or record scripts.
18. Provides a mechanism for the user to define a close method for the application page, screen or window being displayed image eliminating the need to write code or record test scripts.
19. Provides a mechanism for capturing and parsing the value and state of each application element to be used for defining verification methods image eliminating the need to write code or record test scripts.
20. Provides the ability to develop and test methods against the snapshot making it unnecessary to have access to the application to build automated tests.
21. Provides a means for the user to configure an automatic recovery system for automated testing by interacting with a series of snapshots eliminating the need to write code or record test scripts.
22. Provides a means for the user to add attributes to the object definitions to be used in the execution of pre-defined tests. For example the user can describe an input field as being required or optional. Users can also describe boundary conditions, acceptable data types or valid values.

The drag operations are non-native operations because they need not cause the application to respond in the same way as is intended during ordinary operation of the application. And while drag-and-drop operations are illustrated as a suitable method of nonnative interaction with an AUT, other interaction methods could also be employed. The user could use double-clicks or shift-clicks, for example, or the UA could simply enter a mode where input is treated as nonnative input.

Paths

The UA can employ a path statement that provides a powerful notation for uniquely describing application objects. A path statement is a Boolean expression that returns TRUE if an object in the image (or AUT at runtime) matches the description being expressed. Otherwise it returns FALSE.

EXAMPLE

WebLink ContinueShopping path[@Text=="Continue Shopping"]    [1]

The use of the path statement preferably provides the following primary features:

1. All GUI objects defined in the application interface are specified using a path.

2. The GUI objects which comprise an application are exposed in the form a tree. Each object in the tree has a set of attributes which contain both visible and internal values of that object.

3. The tree of GUI objects is represented as XML within the snapshot.

4. The XML representation used by UA provides an easy mechanism to assign objects to a class hierarchy for proper factoring of common properties and methods.

5. The design for the path statement is similar to that of XPATH, a language used to identify XML elements.

6. The path statement introduces many unique concepts, most notably relative expressions (object A is above object B).

7. Beyond identifying specific objects, paths also allow a collection of objects to be logically grouped. For example, a group of text objects which are aligned can be organized as a table with rows and columns.

Selectors

The UA can employ selectors, which are used to select from a list of items or objects that are contained in a class or object. Built-in selectors are provided for list-oriented controls like List Box, List View and Popup List. User-defined selectors can be defined for custom lists or to override and extend built-in selectors.

A common use of selectors is to provide a way to select and get the items in controls like List Boxes, List Views and Popup Lists. Controls like these define a class called 'Item' used for specifying items within that control. The Item class then defines selectors which allow the list of items to be searched. List-oriented controls can typically be searched by text or by index.

List View is an example of a list-oriented control with built-in selectors that are defined for the List View class. Selectors are provided to select a row by index, select an item in a row by column name, or select an item in a row by index. Since the items in a List View are not always arranged in rows and columns, items can also be selected by index, by text and by partial text without reference to a row. In the example below a selector is added to the OrderLines List View to provide a way to select a row by key field:

```
ListView OrderLines
  path ListView[1]
  class Row
    selector [string Key]
      path [contains Item[@ColumnName=="Item",@Text like "*({Key})"]]
```

The selector would be used in a test script as follows:
Print (OrderLines.Row("497474").Item("Expected On").GetText( ))

The use of selectors preferably provides the following primary features:

1. Selectors are provided to allow access to arbitrarily nested application objects which are typical in browser based applications.

2. The selector allows container objects (like tables, lists, trees) to be addressed using a set of parameters determined by the user. A selector is a component of the application interface.

3. A selector is a query against the full set of objects owned by a container.

4. A selector need not necessarily be unique.

5. Selectors can be combined to provide a powerful query mechanism.

Use of the UA will now be described in more detail.

Figure 3:
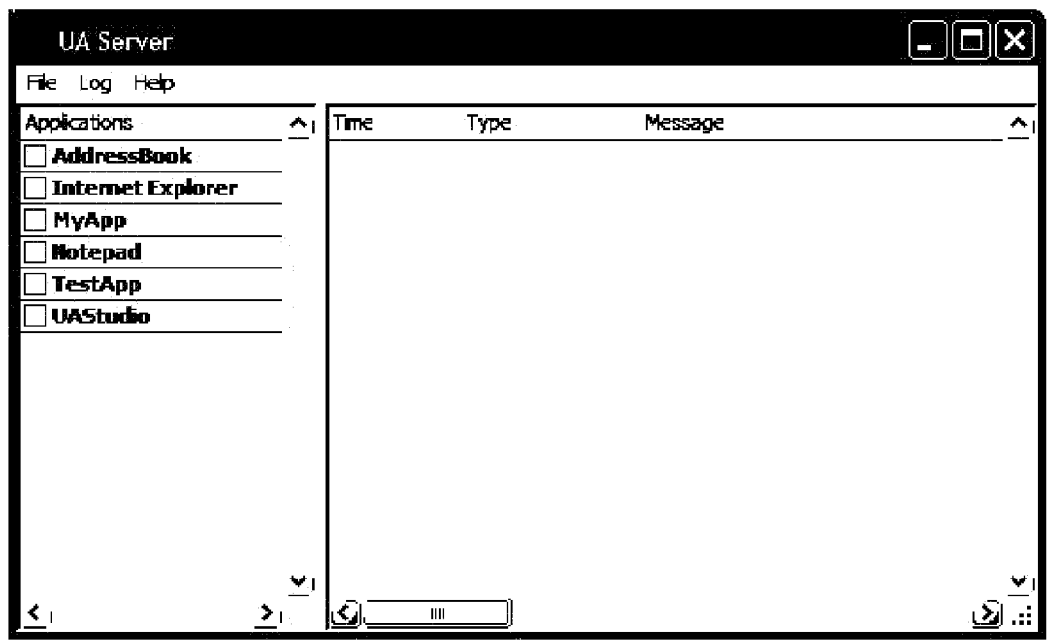

Referring to FIG. 3, an application profile stores test configuration information about an application. It includes data required by the UA to properly test an application. To create a new application profile, the user can select the 'New Profile' menu item from the File menu of the UA Server.

Figure 4:
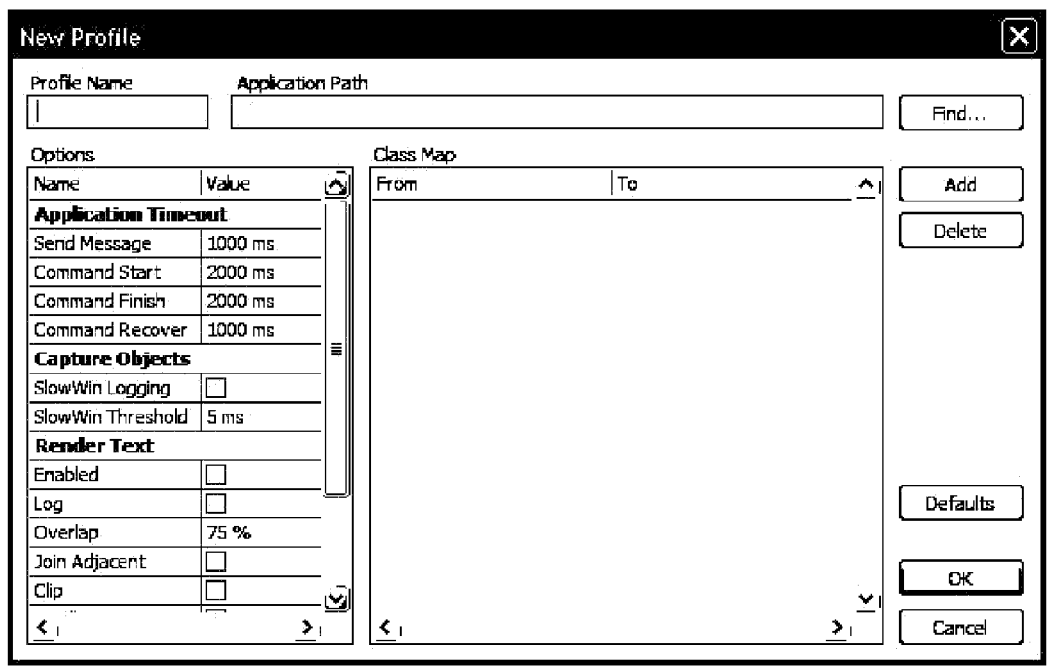

Referring to FIG. 4, the user can click on the Find button in the New Profile dialog box to find an application to be tested.

Figure 5:
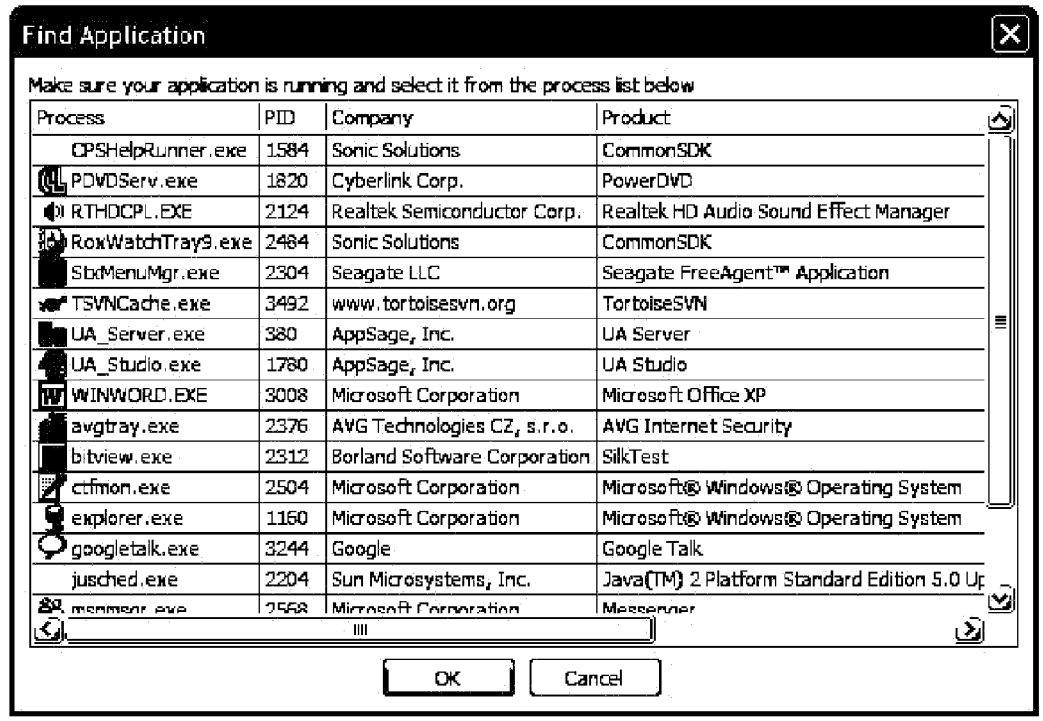

Referring to FIG. 5, the user can find the application to be tested in the list of processes and click OK to create the profile.

Figure 6:
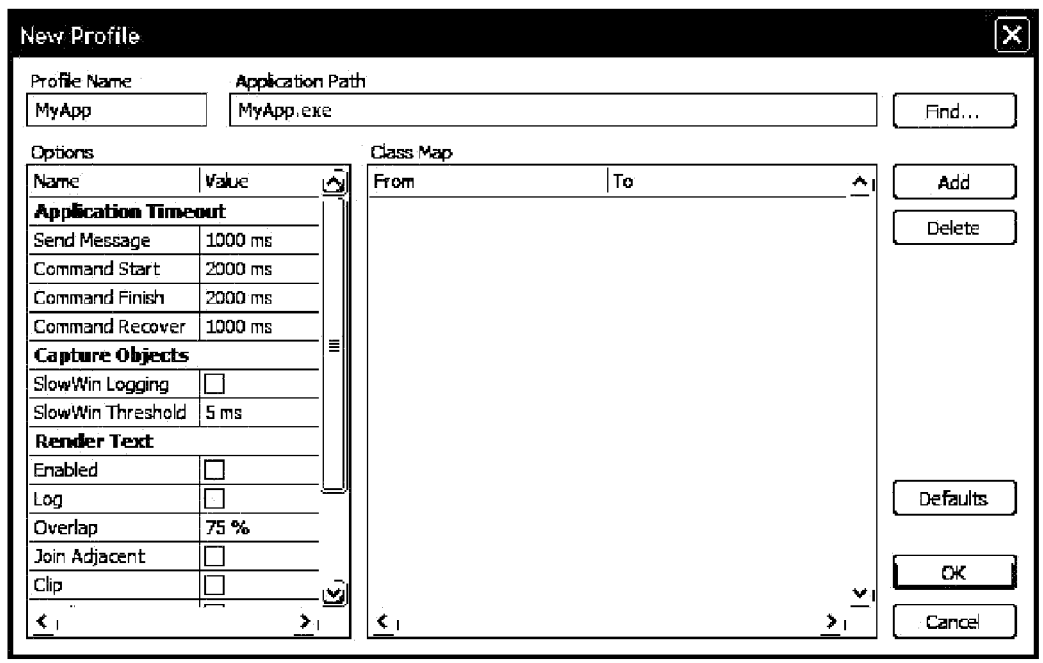

Referring to FIG. 6, the default options can be automatically selected. In most cases there is no need for the user to change the default options. Profile maintenance, including Edit and Delete profile, is intuitive and does not require instruction. The user can access profile creation and maintenance features using either a right-click popup menu or a UA Server File menu.

Figure 7:
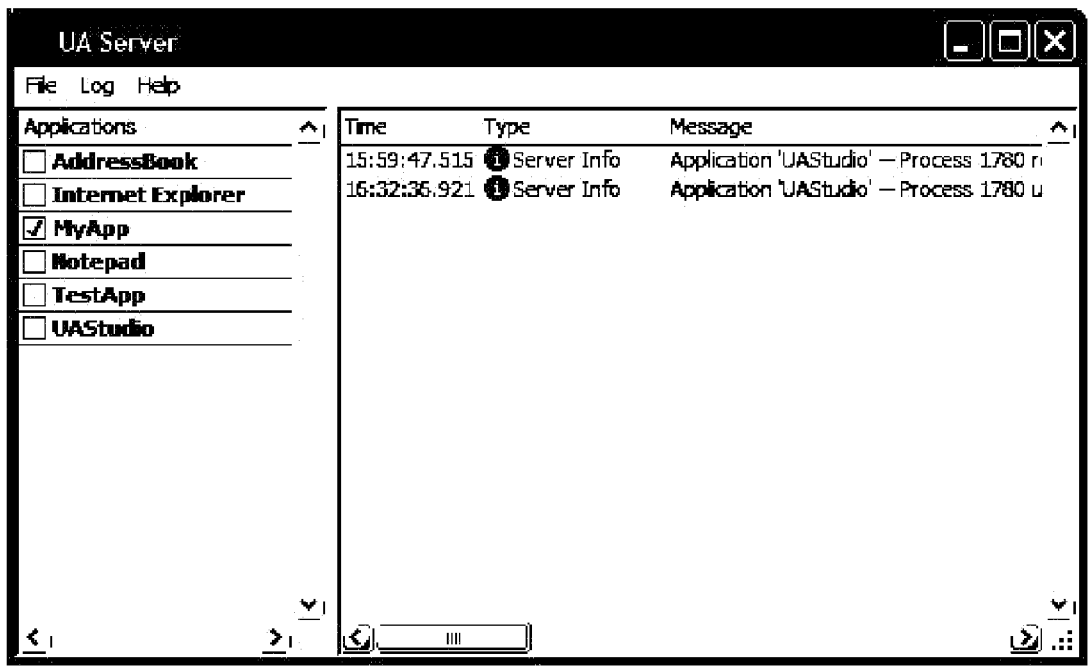

Referring to FIG. 7, to test an application with the UA, the user checks the associated profile name of the application in an Applications list in the UA Server.

Figure 8:
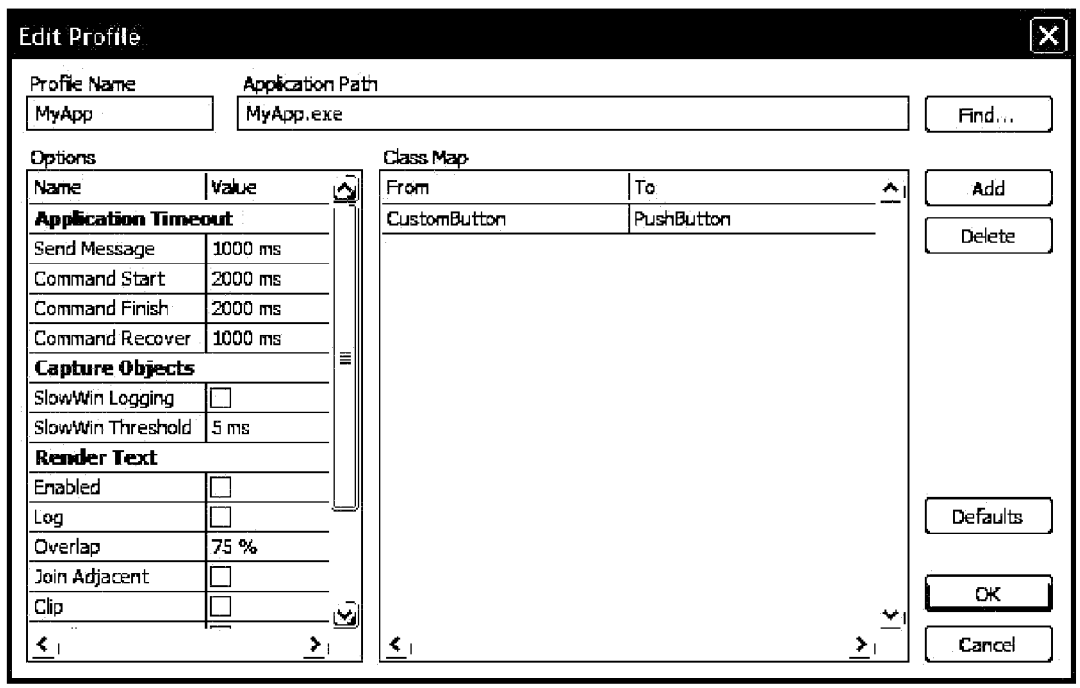

Referring to FIG. 8, custom classes can sometimes be mapped to standard classes in order to inherit properties and methods from the UA class library. Generally if a custom class is derived from a standard class, class mapping should be considered. To map a class, the user can click the 'Add' button to create a new line in the Class Map List. The user can then input the From and To classes and click the 'OK' button to continue.

Referring to FIG. 9, the right panel in the UA Server dialog displays a log of communication between UA and the application under test.

The UA is comprised of seven panes that allow the user to create and test object definitions for automated testing. Object panes can be expanded, collapsed and resized easily by the user for convenience and to maximize the workspace. The user can use the icons in the upper right corner of the pane to collapse. The user can click anywhere on a collapse pane to expand. The user can also resize the panes by pressing the mouse on a pane border and dragging to the desired height and width.

Referring to FIG. 10, shows the Snapshots pane. The Snapshots pane is a navigator that allows the user to select a Snapshot for the target screen or page to be defined or modified.

Figure 11:
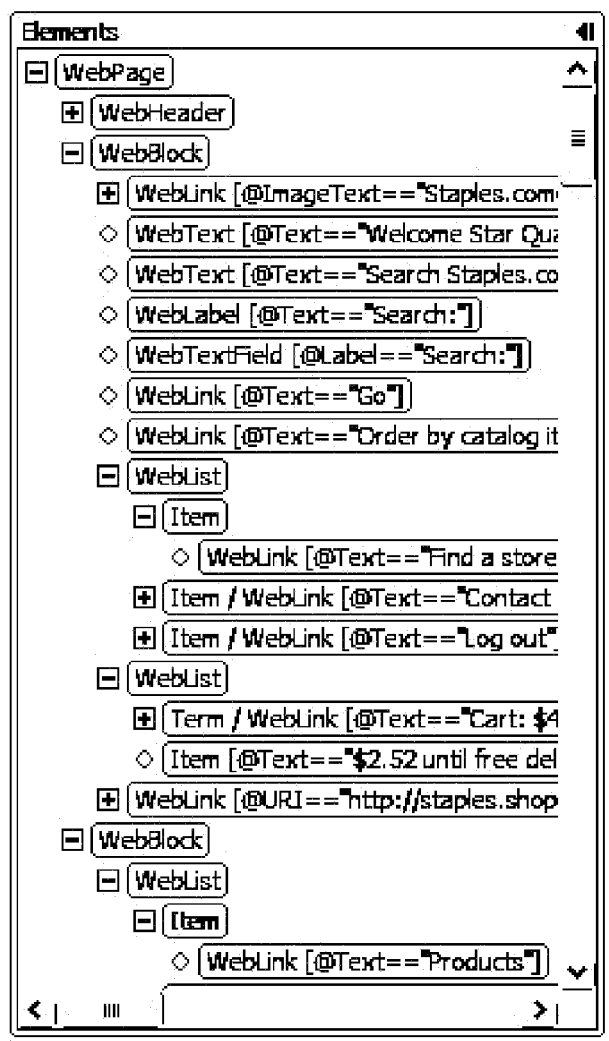

Referring to FIG. 11, the elements pane provides a view of the application hierarchy. The element Tree traces the relationships of the elements on the screen or page captured in the snapshot and displays the class of each element. For some classes, an attribute is displayed following the class name to help identify the object. An attribute starts with the @ symbol.

Referring to FIG. 12, the attributes pane displays the attributes for the element selected in the Element Tree.

Attributes can be used to create object paths. Examples of attributes include 'Text' defined for 'RenderText' and 'NumItems' defined for 'PopupList'.

Figure 13:
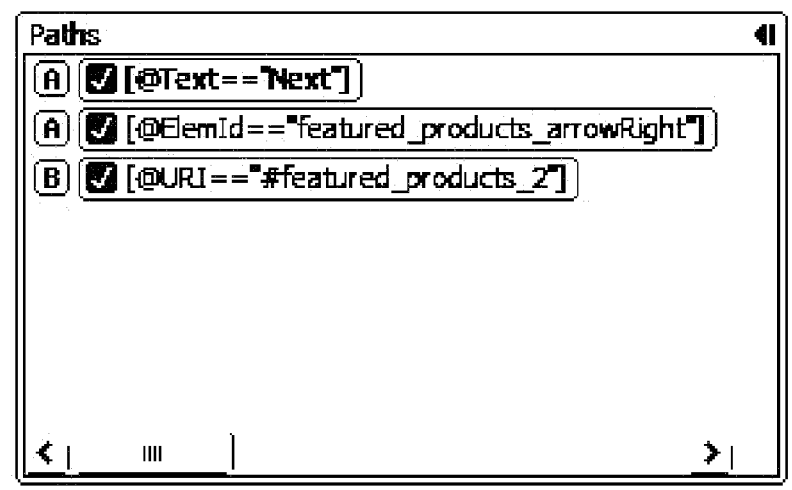

Referring to FIG. 13, the Paths pane displays automatically generated paths for the selected object. These paths can be dragged over to the Editor pane to define z objects.

Figure 14:
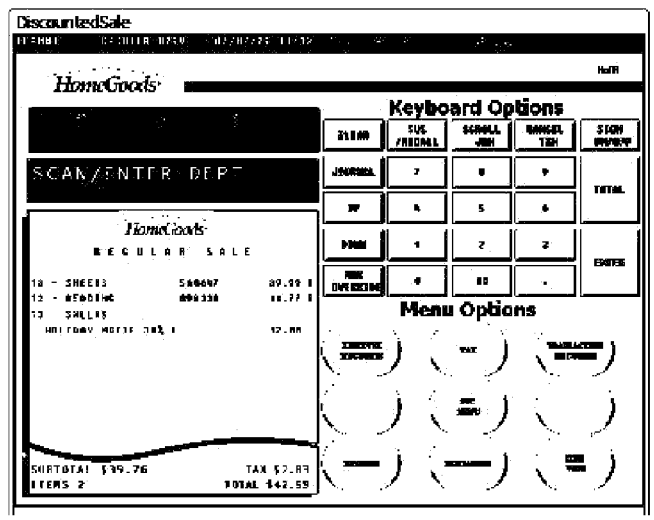

Referring to FIG. 14, the Image pane displays the selected Snapshot.

Figure 15:
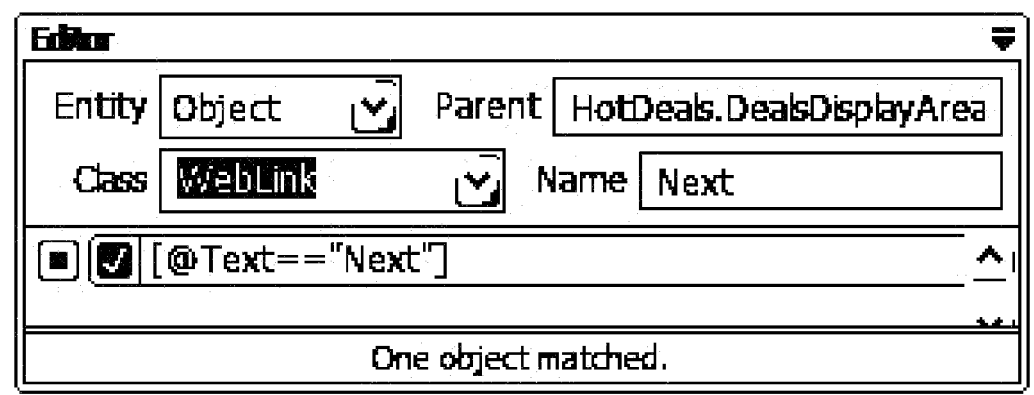

Referring to FIG. 15, the Path Editor pane allows the user to edit object definitions.

Figure 16:
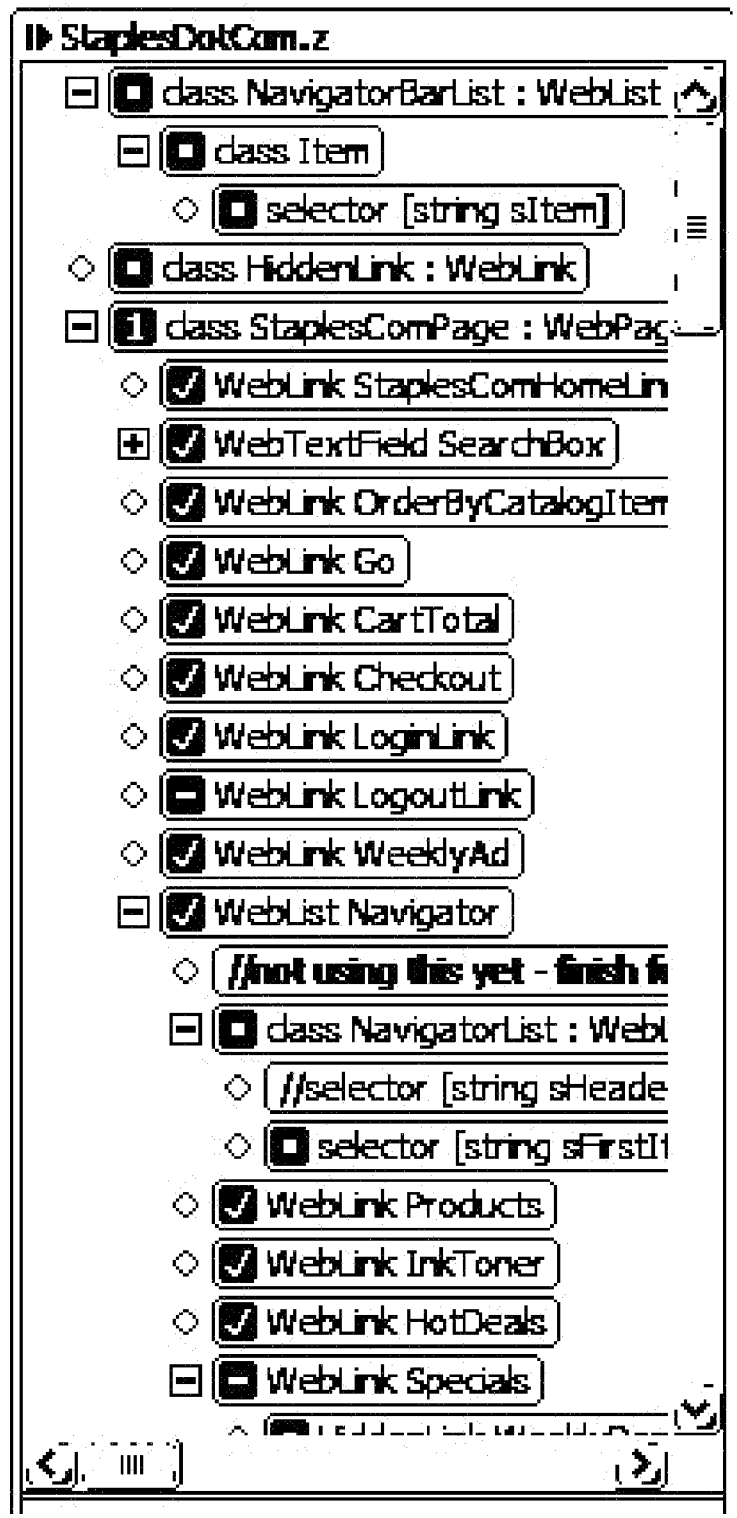

Referring to FIG. 16, the Z pane displays the object definitions for the application under test (AUT).

Figure 17:
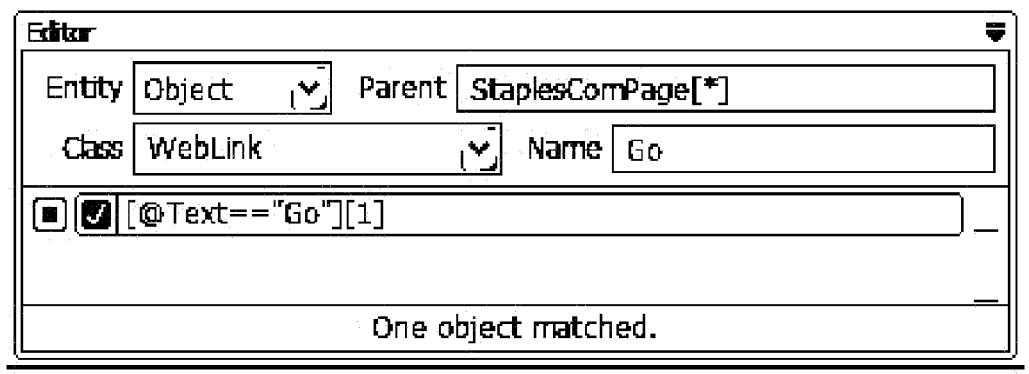

Referring to FIG. 17, the object definition is comprised of three parts: class, name and path. The class of the object describes the type of object and relates it to a class library where methods are defined. Class is selected from a list of available UA object classes. The name of the object is arbitrary. It should not contain spaces or special characters. The user should provide a name that will allow the object to be easily recognized. The path provides the test tool with the ability to recognize and locate objects in the application being tested. Object definitions are stored in a file with the extension 'z '. A path statement returns TRUE if Z finds an object that matches to description being expressed. Otherwise it is FALSE. The path statement is described in more detail in the description and figures following.

Figure 18:
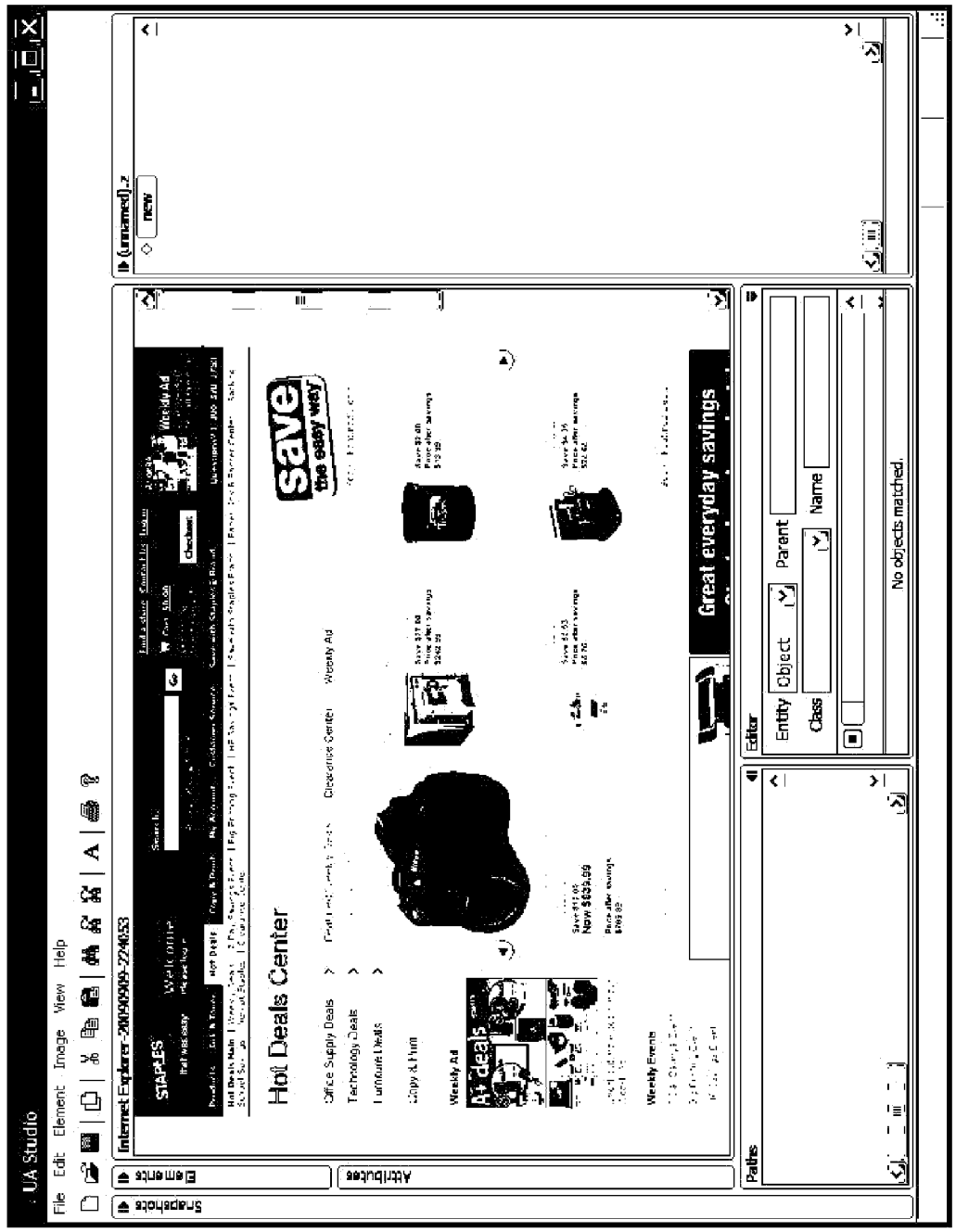

Referring to FIG. 18, the UA provides several ways to generate object definitions automatically using the mouse. Object definitions can be created for an entire window, a group of elements within a window or a single element. To declare a Main Window, Web Page, DialogBox or any other top level window, the user can click on the caption of the window in the Snapshot Image and drag it over to the Z pane. The user can then drop it over the node that displays the word 'New'. The Paths and Editor panes describe the object being defined. The Paths pane lists a number of possible paths. The Editor displays the default Path along with Class and Name of the object.

Figure 19:
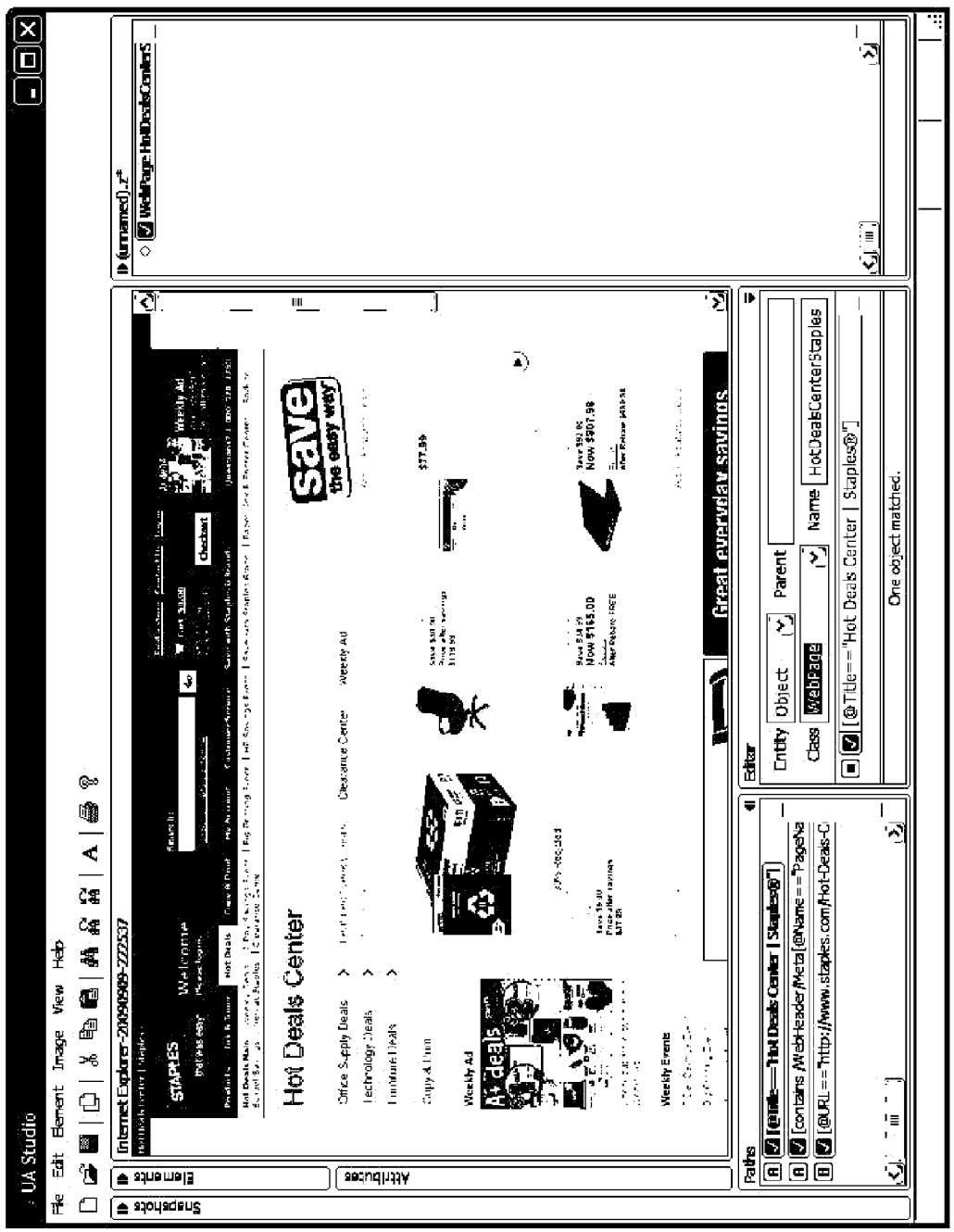

Referring to FIG. 19, the user can select a different path for the window being declared, by dragging a path from the 'Paths' pane to the checkmark icon in the Editor pane. This action will cause the selected path to replace the existing path. To select an additional path the user can either double-click the desired path in the 'Paths' pane or drag it over to the 'Editor' pane just below the default path. Doing so creates multiple paths. Z interprets multiple paths with a logical 'OR'. The user should caution that objects that match any of the multiple paths will be resolved. The user can disable a path by clocking on the icon to the left of the checkmark icon. A disabled path is ignored by Z for object recognition.

Figure 20:
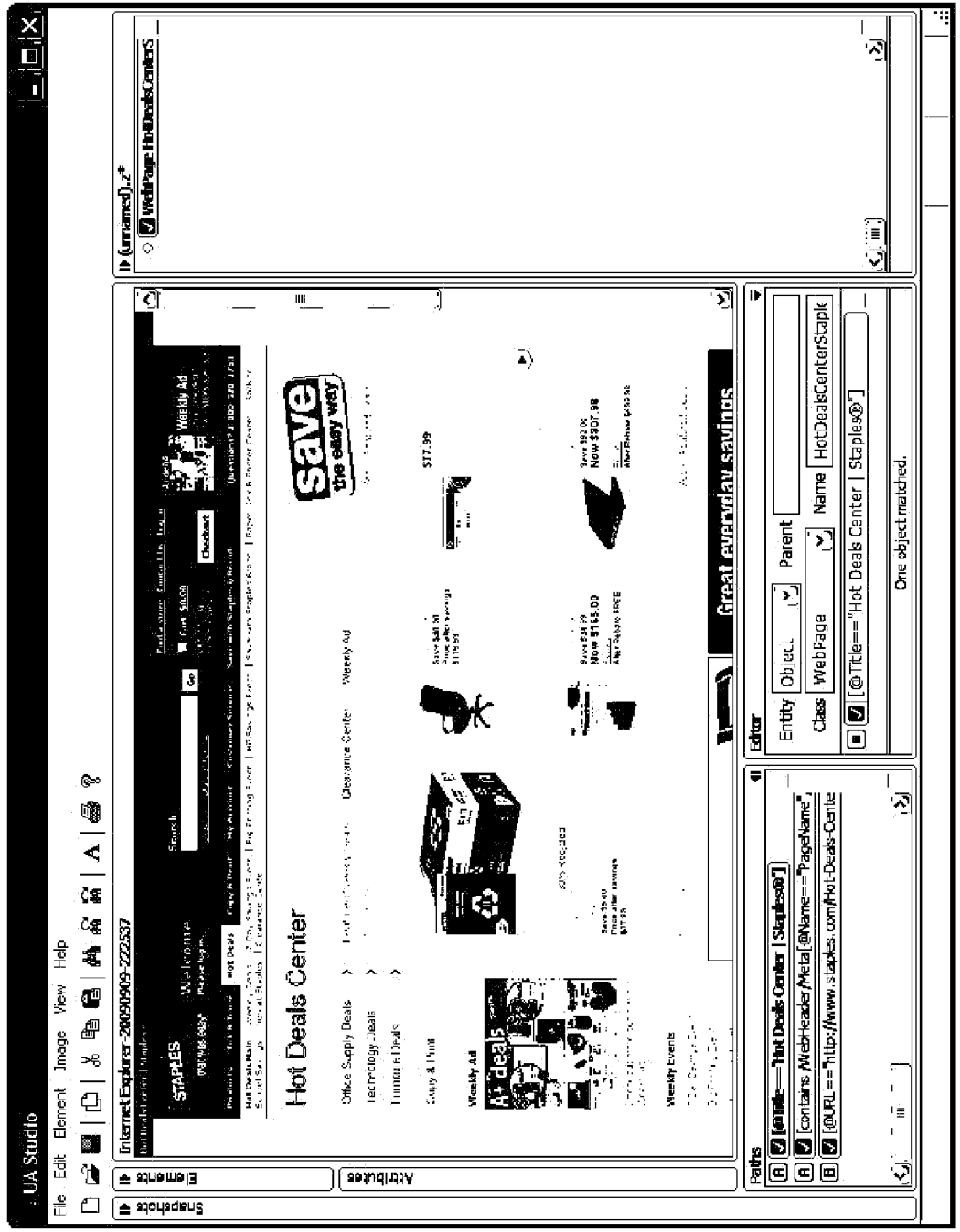

Referring to FIG. 20, declarations for controls (TextFields, PushButtons, etc.) on a page or screen can be generated in one of four ways: a single element, groups of elements using the <Ctrl> key combined with a mouse click, groups of elements by drawing a rectangle with the mouse, and an entire dialog box with all its contents. To define a single element, the user can click on it in the Snapshot Image and drag it to the Z pane nested one level below the window in which it is contained. The user can examine the suggested paths in the Paths pane and decide which path(s) would best define the object in the various contexts that it might be encountered in.

Figure 21:

Referring to FIG. 21, to define multiple objects in one step, the user can press the <Ctrl> key and Click any number of controls. The user can then drag any of the selected controls to the Z tree nested one level below the window of which the controls are contained. All of the selected controls will be defined. Another way of defining multiple controls in a single step is for the user to hold down the <Shift> key, click the mouse in an area of the window and drag a rectangle around a group of controls to be defined. Then drag any of the selected controls to the Z tree nested one level below the window in which it is contained. All controls that overlap the rectangle will be declared.

Figure 22:
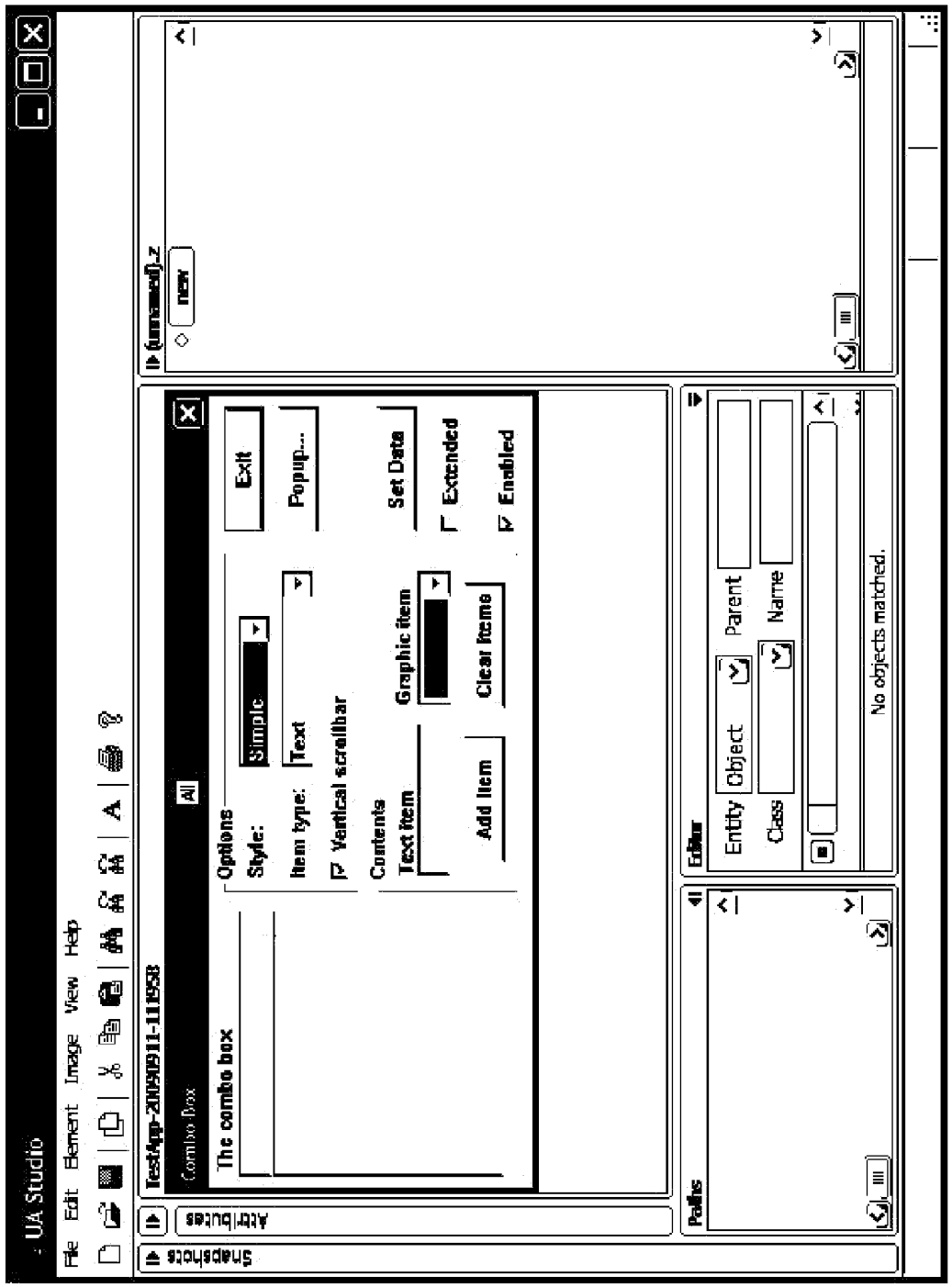

Referring to FIG. 22, to define a window and all of its contents in one step, the user can click on the All icon in the center of the window caption and drag it to the node with the text "New" in the Z tree.

Figure 23:
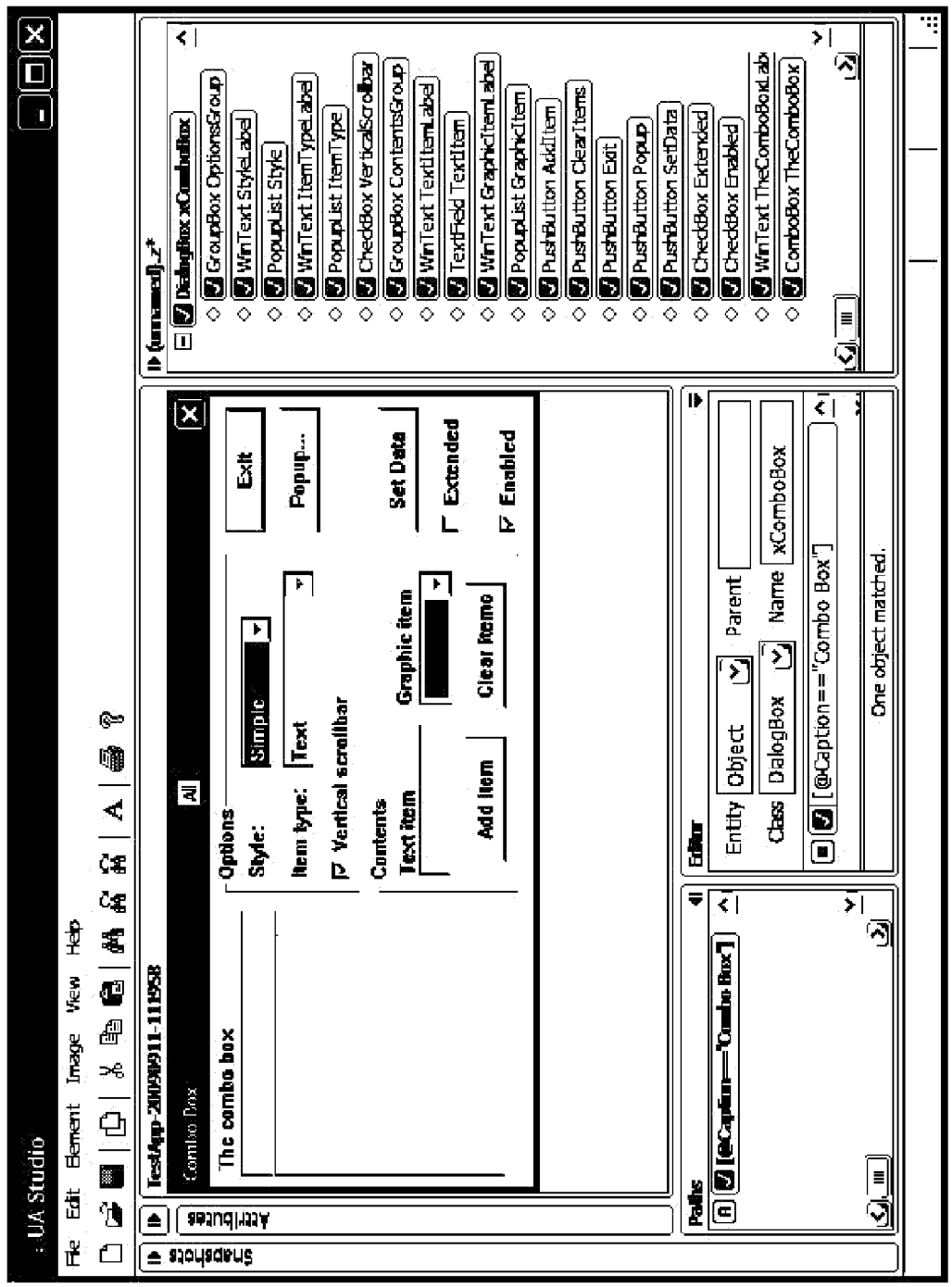

Referring to FIG. 23, the UA provides visual feedback while building object definitions so that the user can be certain that your path statements will allow Z to locate and interact with application objects. Colored icons are used to indicate matches vs. non-matches in the Z Tree and Path Editor. Messages are displayed to indicate matches, non-matches and errors. Snapshot Image highlight ensures that definitions match the correct element.

Figure 24:

Referring to FIG. 24, indicators provide feedback that will help the user determine if the path statement is identifying the correct element. A green check in the Z tree indicates that Z found a single object to match the class and path of the object.

Figure 25:
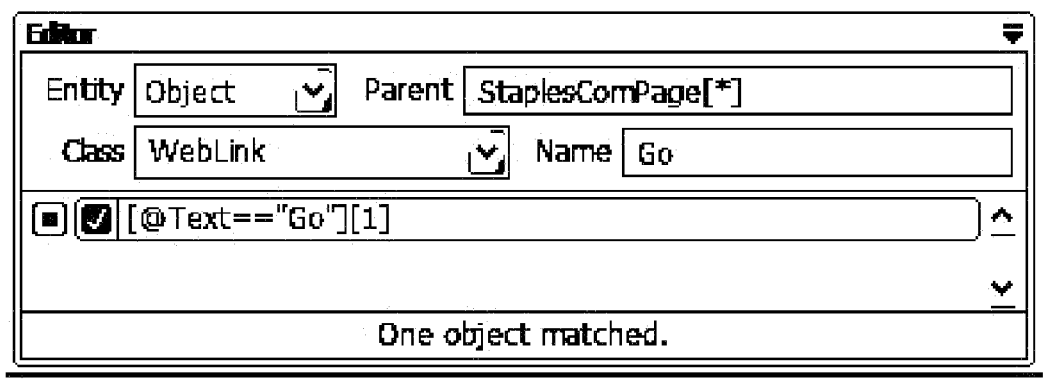

Referring to FIG. 25, the Path Editor will display a green check on the path row and the message "One object matched".

Figure 26:
Figure 27:

Referring to FIG. 26, the yellow highlighter on the Snapshot Image indicates a match. Referring to FIG. 27, a minus icon displays in the Z tree to indicate that no objects match the path statement.

Figure 28:
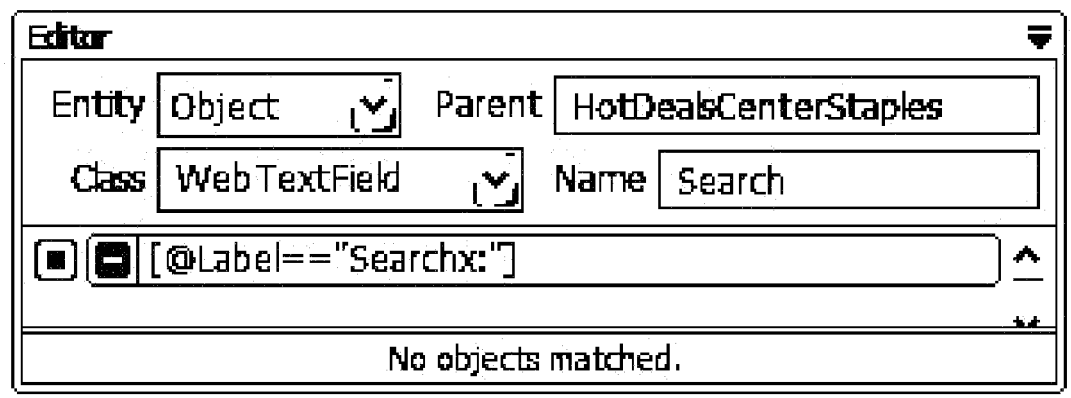

Referring to FIG. 28, a minus icon displays in the Path Editor and the message "No objects matched" is displayed.

Figure 29:
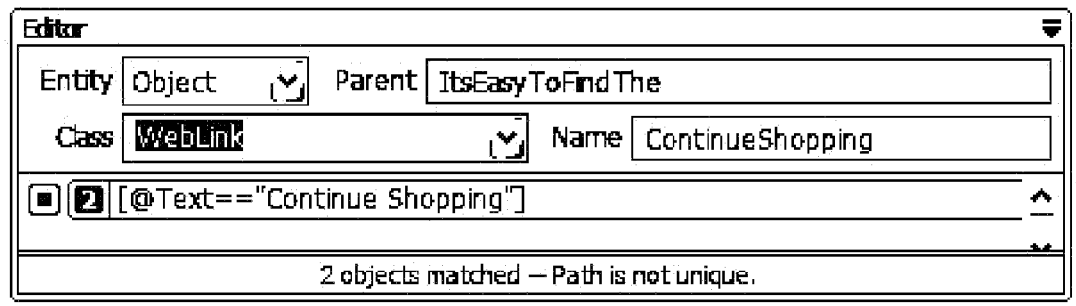

Referring to FIG. 29, if the path matches more than one element in the Snapshot, the Path Editor displays a red icon enclosing a numeral and the message "N objects matched—Path is not unique".

Figure 30:
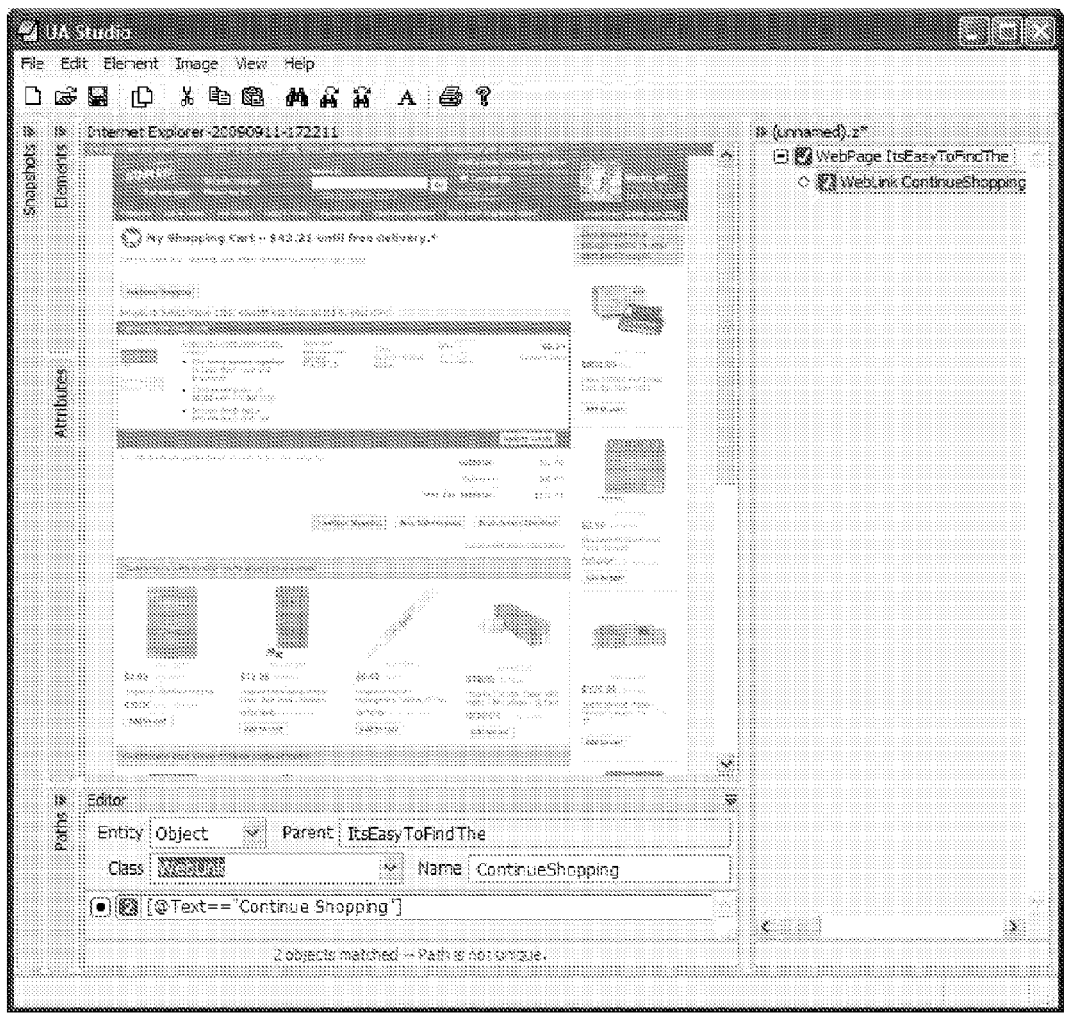

Referring to FIG. 30, the Z Tree will also display the red icon enclosing a numeral that indicates the number of matches. The Snapshot image will show multiple elements highlighted in yellow.

Figure 31:
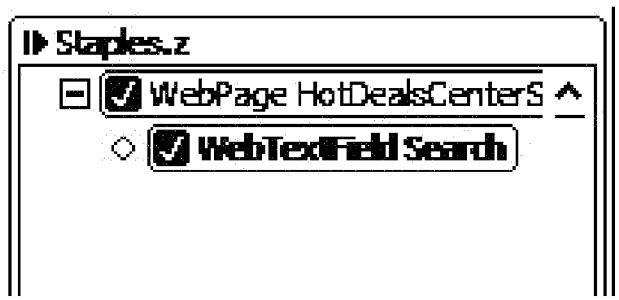

Referring to FIG. 31, to modify a path for an existing object, the user first selects the object in the Z pane.

Figure 32:
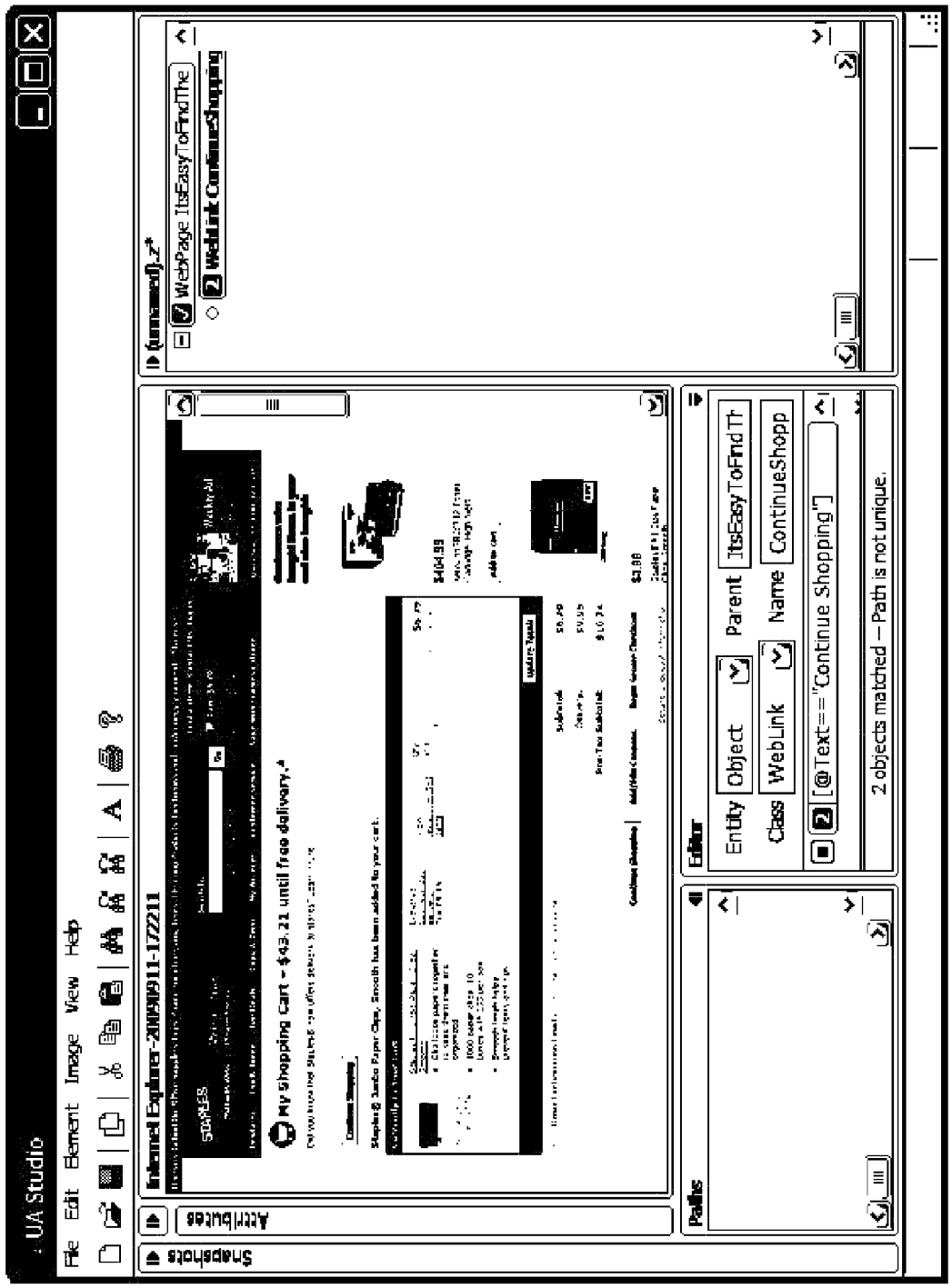

Referring to FIG. 32, the user then clicks the element in the image and drag it to the 'Paths' pane.

Figure 33:
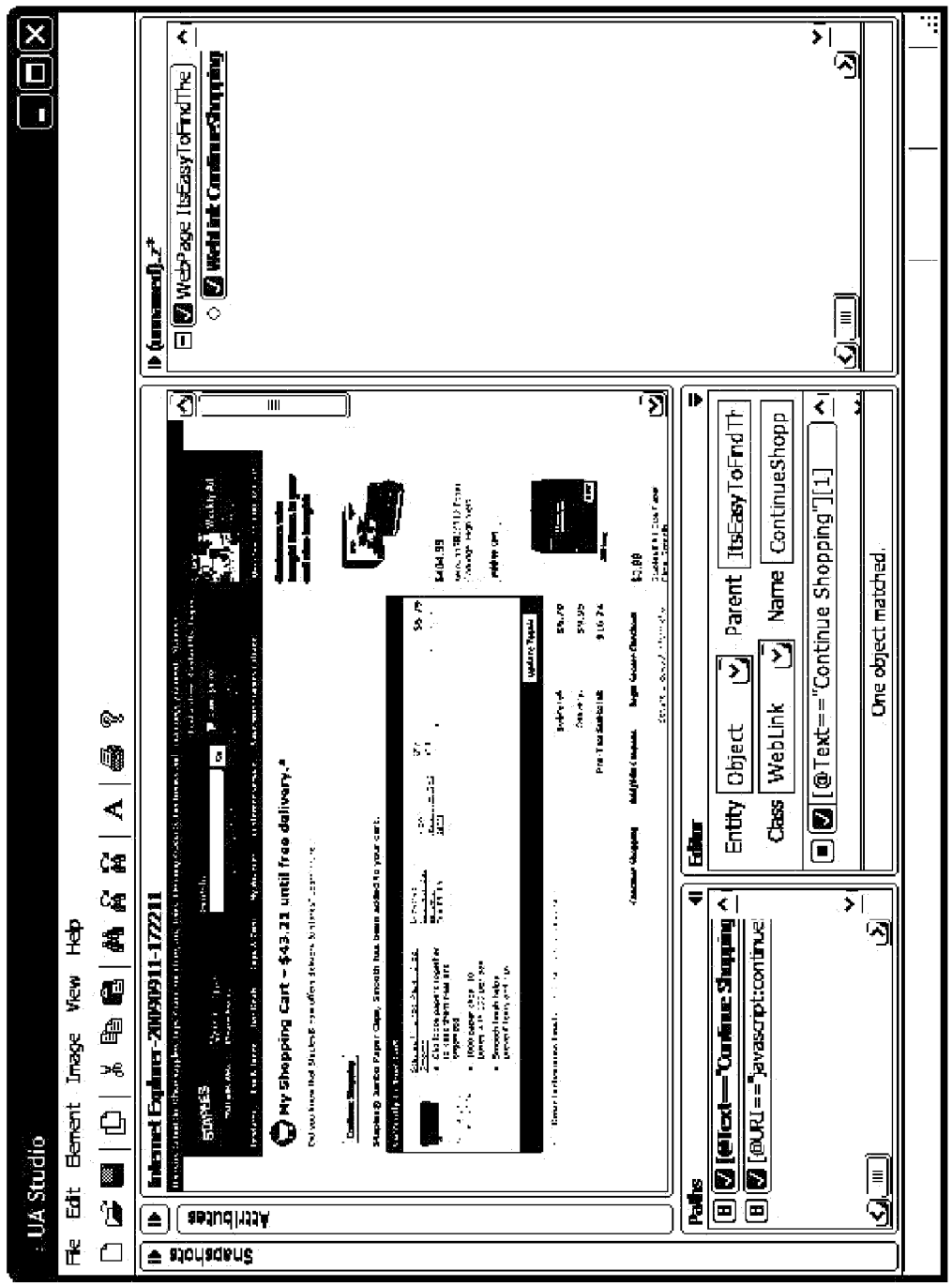

Referring to FIG. 33, the user can select from the displayed paths and drag or double-click to update the selected path in the 'Path Editor' pane.

Figures 34, 35:
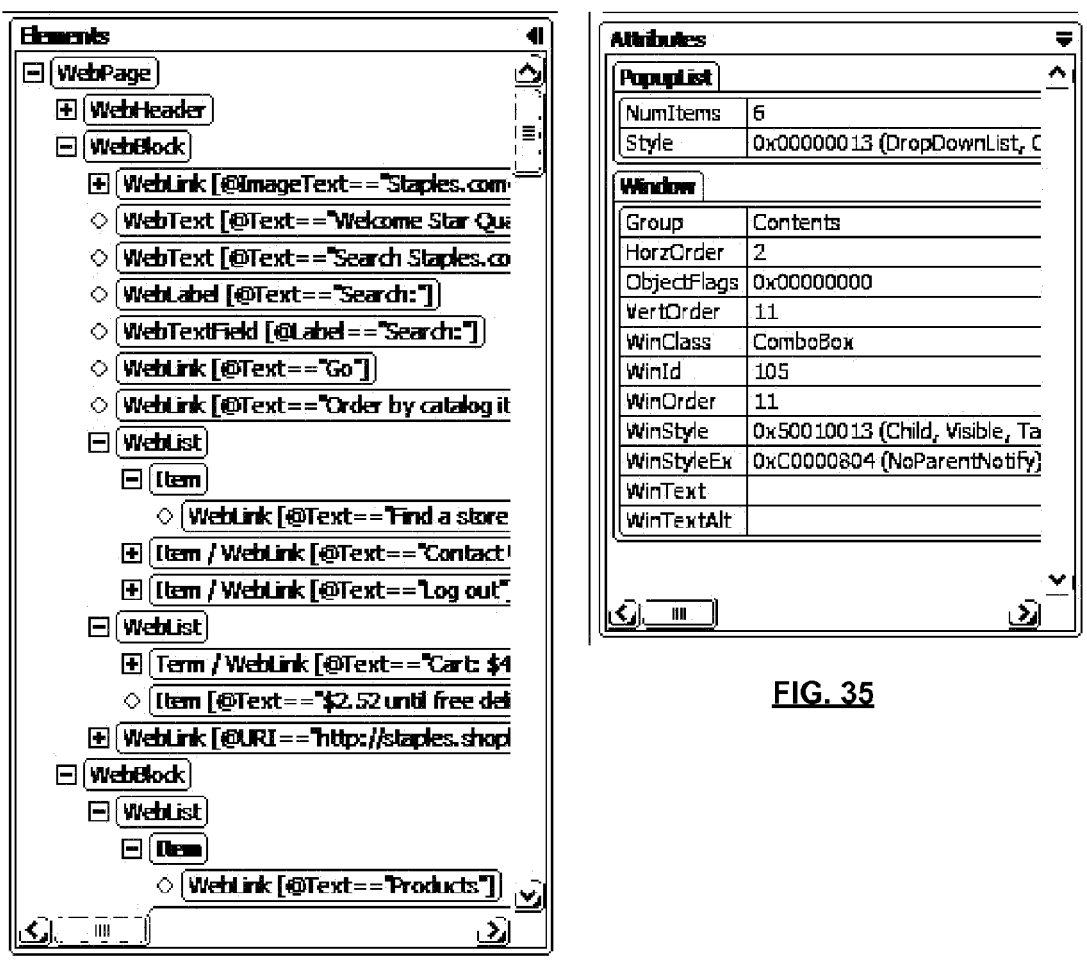

Referring to FIG. 34, the Elements panel provides a hierarchal view of the application. Each element contains attributes which describe the various elements in the tree. In this section, the figures exhibit how to use those attributes to build object paths. The Elements panel provides a view of the application hierarchy. The Element Tree traces the relationships of the elements on the screen or page captured in the Snapshot and displays the class of each element. For some classes, an attribute is displayed to help identify the element. An attribute starts with the @ symbol.

Referring to FIG. 35, the Attributes panel displays the attributes for the element selected in the Element Tree. Attributes can be used to create object paths. Examples of attributes include 'Text' defined for the class of 'RenderText' and 'NumItems' defined for the class of 'PopupList'.

Figure 36:
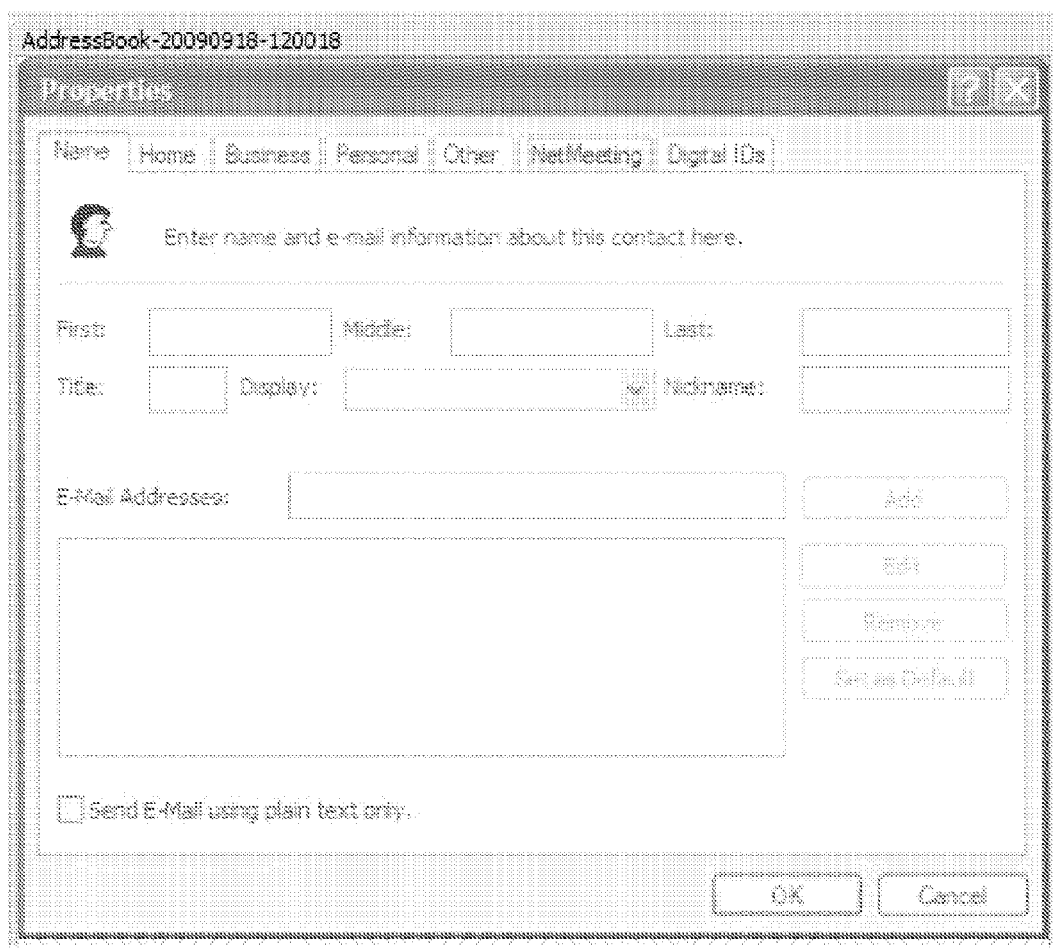

Referring to FIG. 36, to create paths using the Elements Tree, the user can click on the desired element to define in the Snapshot image so it will be highlighted in the Element tree.

Figure 37:
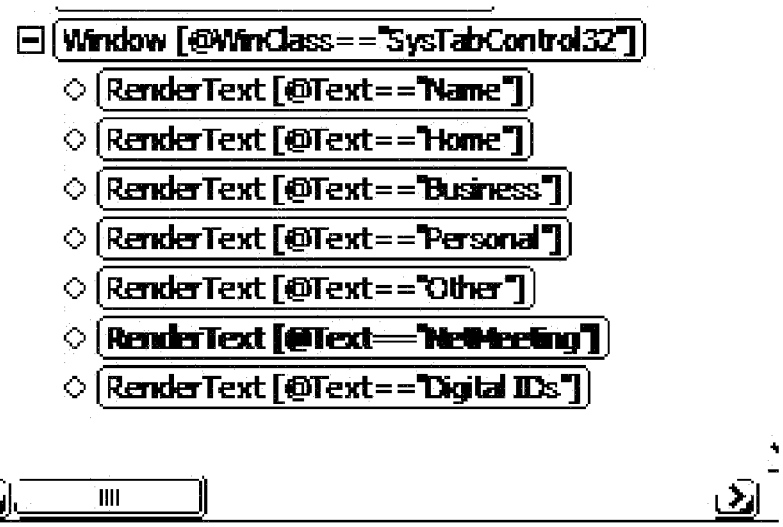

Referring to FIG. 37, the user then drags the Element from the Element Tree to the appropriate location in the Z tree.

Figure 38:

Referring to FIG. 38, the user can move the 'New' node to the appropriate level in the tree using the <Alt> key and the right or left arrow keys. An alternative method of creating a 'new' node is to position the cursor in the Z tree above the location where the user wishes to create the node and press the <Alt> and <Insert> keys together.

Figure 39:
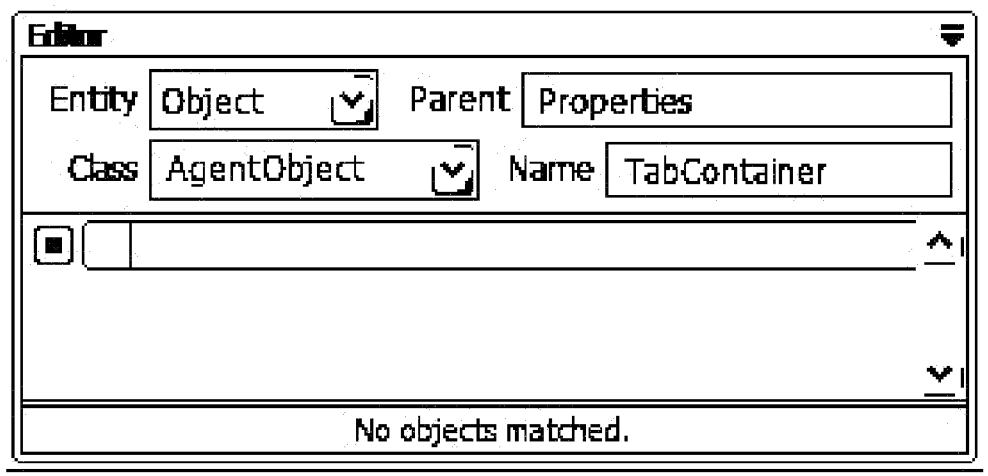

Referring to FIG. 39, the user then selects 'Object' from the Entity PopupList and 'AgentObject' from the Class PopupList and there can provides a name for the object.

Figure 40:
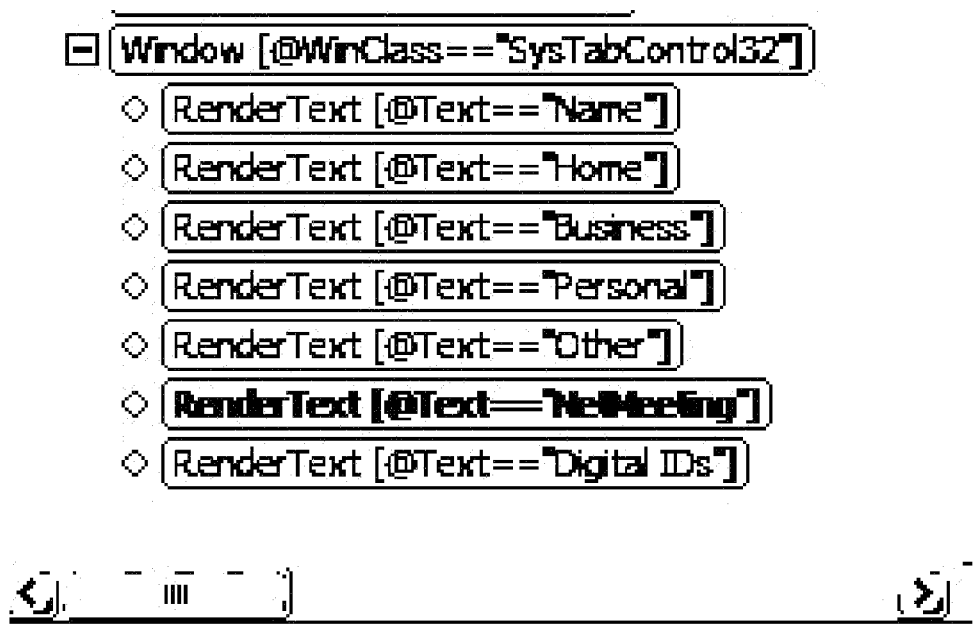

Referring to FIG. 40, the user can click on the desired node to define in the Element Tree and copy it to the clipboard either using the rightclick popup menu or by pressing <Ctrl> and <c> keys together.

Figure 41:
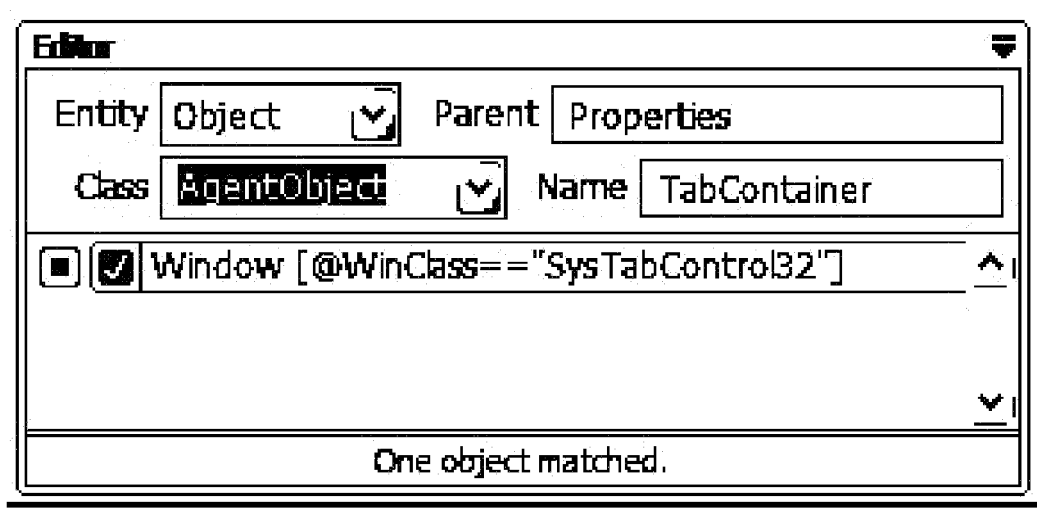

Referring to FIG. 41, the user can paste into the path field in the Path Editor. In some cases the path will be complete. In others the user may have to modify the path using the options mentioned in the description and figures.

Figure 42:
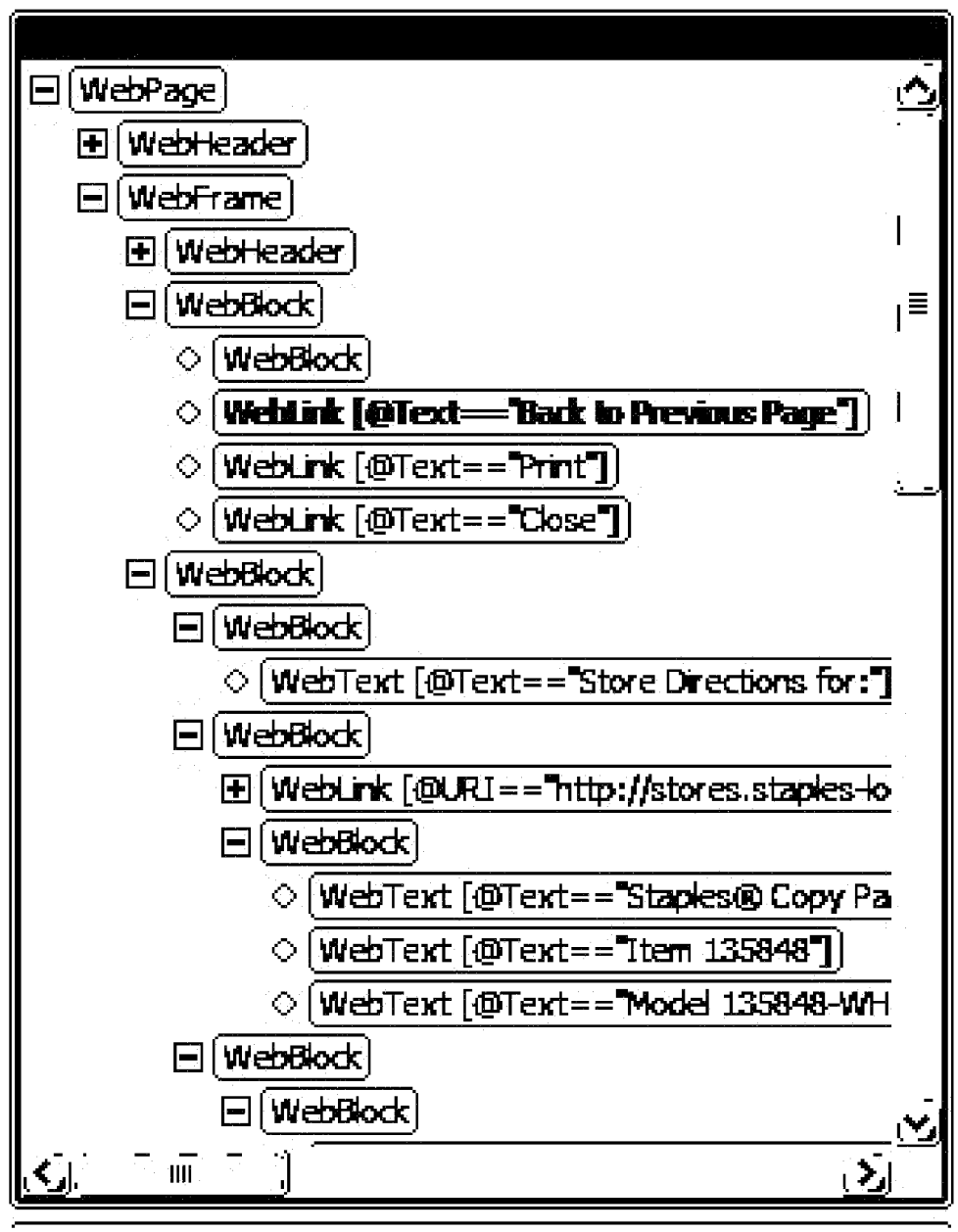

Referring to FIG. 42, the user can create paths using attributes from the Attributes Panel. To create a path, the user can click the desired node to be defined in the Element Tree so that the attributes for that element will display in the Attributes panel.

Figure 43:
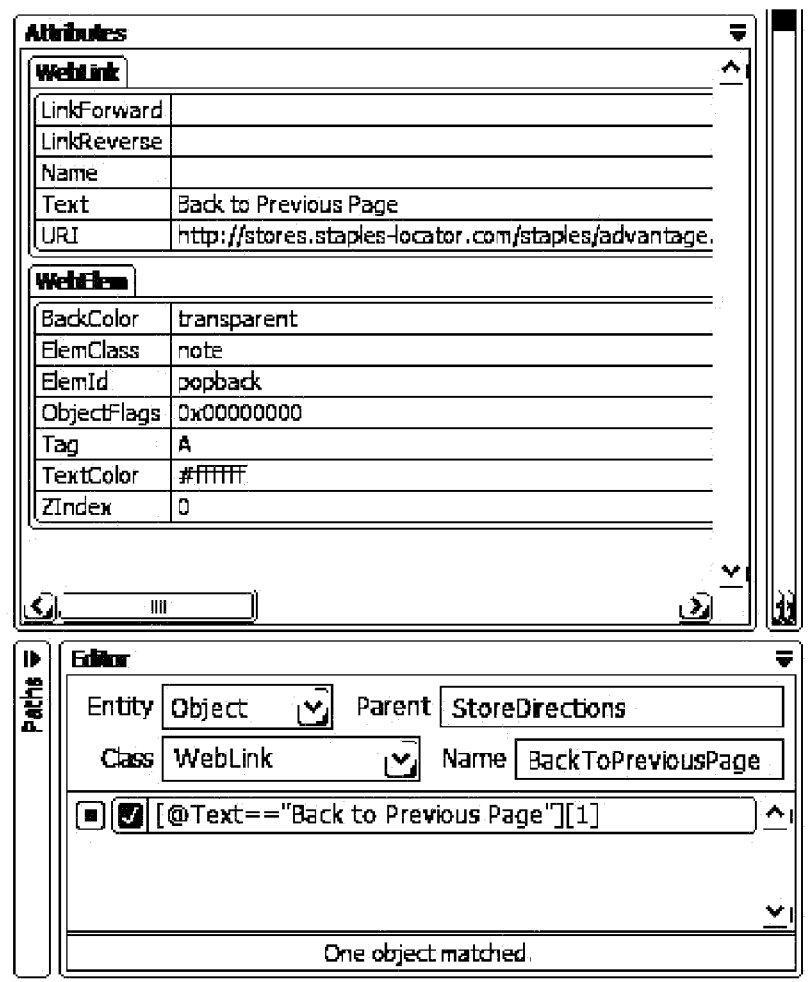

Referring to FIG. 43, the user can then click on the desired attribute to use and copy it to the clipboard either using the right-click popup menu or by pressing <Ctrl> and <c> keys together.

Figure 44:
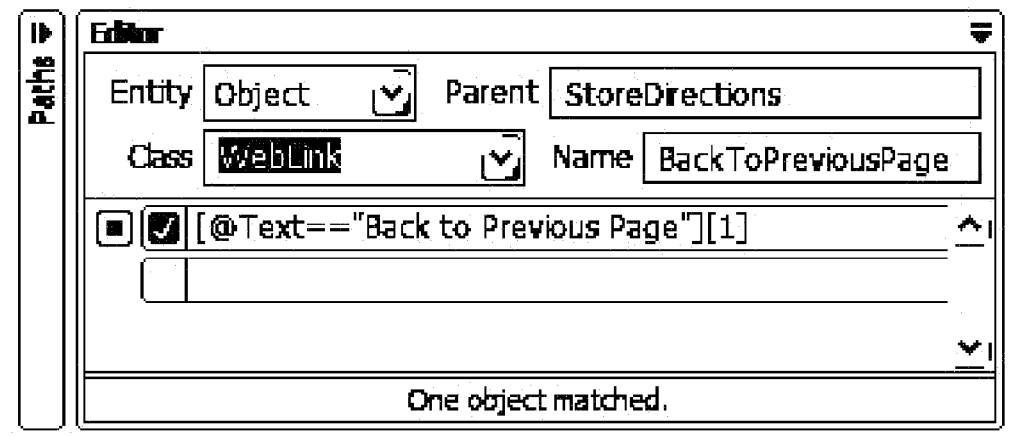

Referring to FIG. 44, the user can create another path line in the Path Editor by hitting <ENTER> at the end of the existing path.

Figure 45:
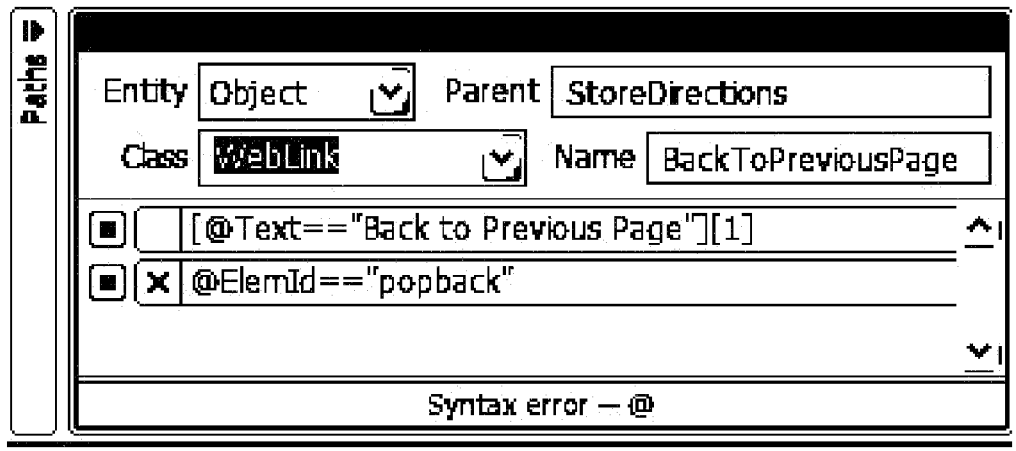

Referring to FIG. 45, when the user pastes the attribute into the path, a compile error like the one on the right can be received.

Figure 46:
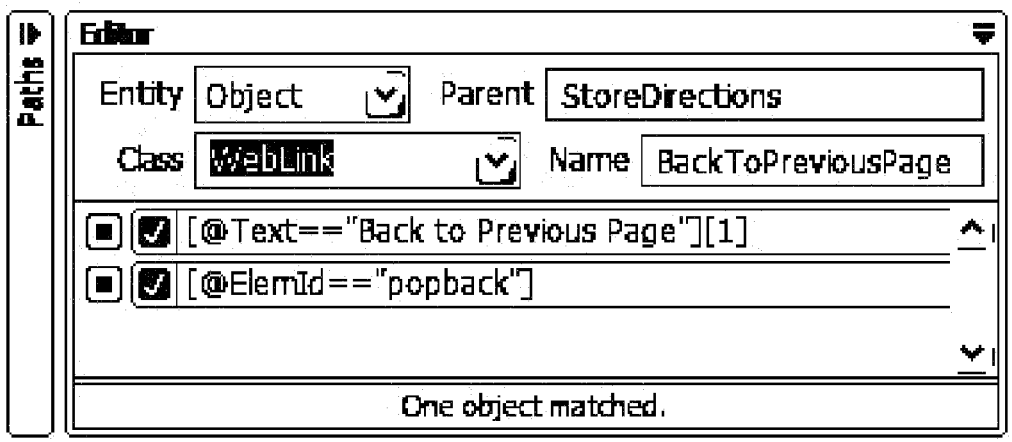

Referring to FIG. 46, the user can resolve the error by simply enclosing the attribute in square brackets [ ] to form a correct path statement.

Figure 47:
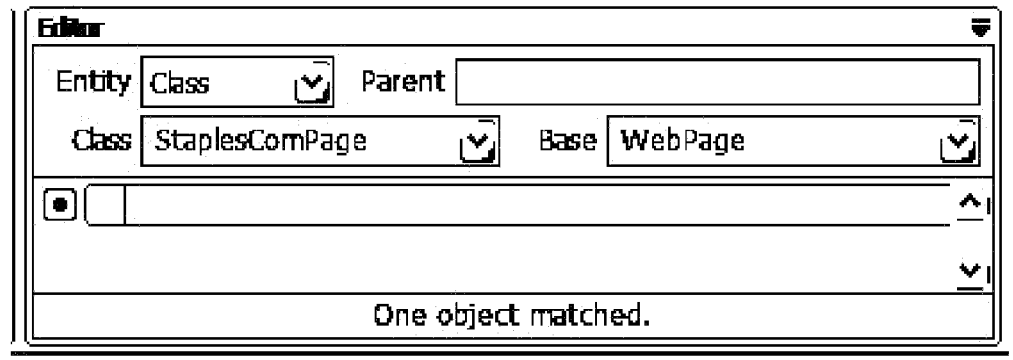

Referring to FIG. 47, the user can use classes to define objects that exist on more than one page or that occur in multiple instances on a single page so that the objects only have to be declared once. To create a class for a page that will contain objects that exist on multiple pages, the user can place their cursor in the Z panel and hit the <Insert> key. In the Editor panel, the user can select 'Class' from the Entity dropdown, shown in FIG. 47. The user then inputs the name of the desired class in the Class field. For example, if the user is creating a class for a web page, the user might call it MyAppPage. The user then Inputs the name of the class that the class is based upon in the Base field. Using the previous example, the user would input 'WebPage'. The class may or may not have a path depending on whether the user wants members of the class to share a path. In the WebPage example on the right, the path is left blank because each member of the class will have its own unique path.

Figure 48:
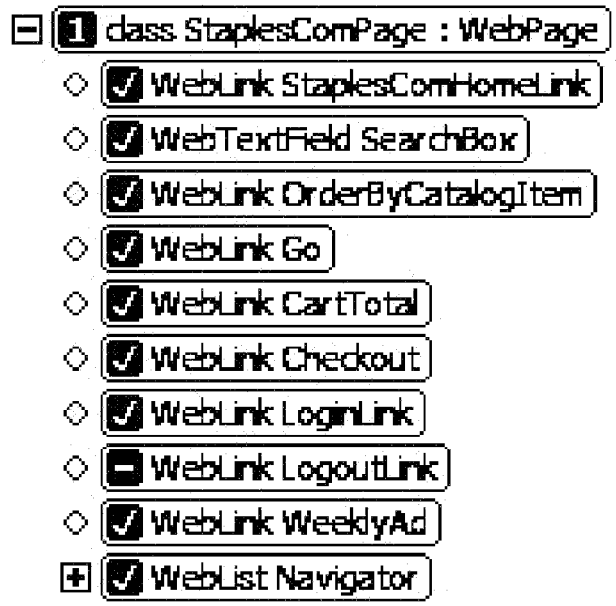

Referring to FIG. 48, to declare objects that will be shared by all members of the class, the user can drag them to the Z panel just like for a top level window.

Figure 49:
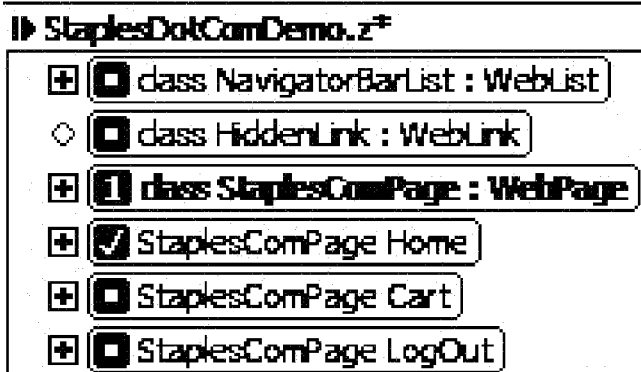

Referring to FIG. 49, the user should always input the name of the new class in the Class field for each of the desired windows to share the objects declared in the class.

Figure 50:
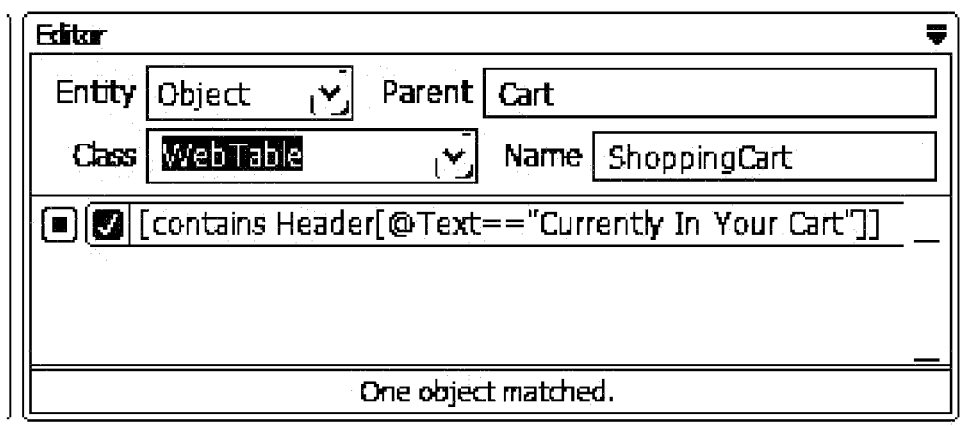

Referring to FIG. 50, there are several ways to define tables in the UA. The method will depend on the structure of the table and how the user plans to interact with it in automated tests. FIG. 50 refers to an approach that defining a table without columns. All of the objects contained in the table are defined directly in the row, where the user will select them using a Selector. Selectors provide a way to identifying any of the objects in a row based on a key field or fields. A Selector is similar to the "where clause" in a SQL database lookup. To define the table, the user selects 'Object' in the Editor Plane from the Entity dropdown. The user then inputs the desired name of the class in the Class field. For example, if one was declaring a table on a web page, the input would be 'WebTable'. The user then provides a descriptive name for the table in the Name field. The user also provides a path to uniquely identify the table. For example, use an object that does not appear anywhere else on the page with the 'contains' keyword, e.g. [contains WebLink [@Text="Currently In You Cart"]].

Figure 51:
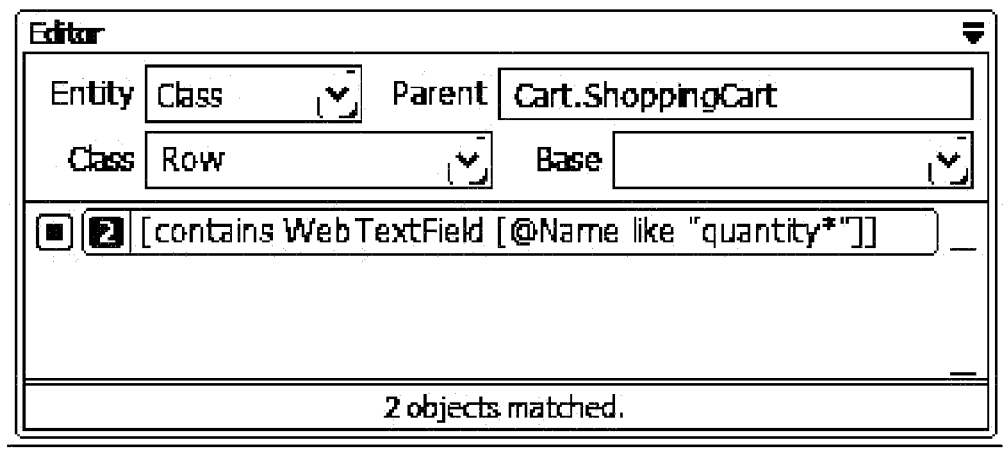

Referring to FIG. 51, the user then creates a class to represent a table row. The user can input an Entity of 'Class' and a Class of 'Row'. The user should leave the Base field blank. There may or may not be a path depending on whether the user needs to filter out rows that are not intended to be part of the table, e.g., [contains WebTextField [@Name like "quantity"]]. This path will filter out any 'rows' which the user does not want to include as part of the table.

Figure 52:

Referring to FIG. 52, the user then can drag objects contained in the row to the Z pane as would any other object but being sure to nest them one level below the Row.

Figure 53:
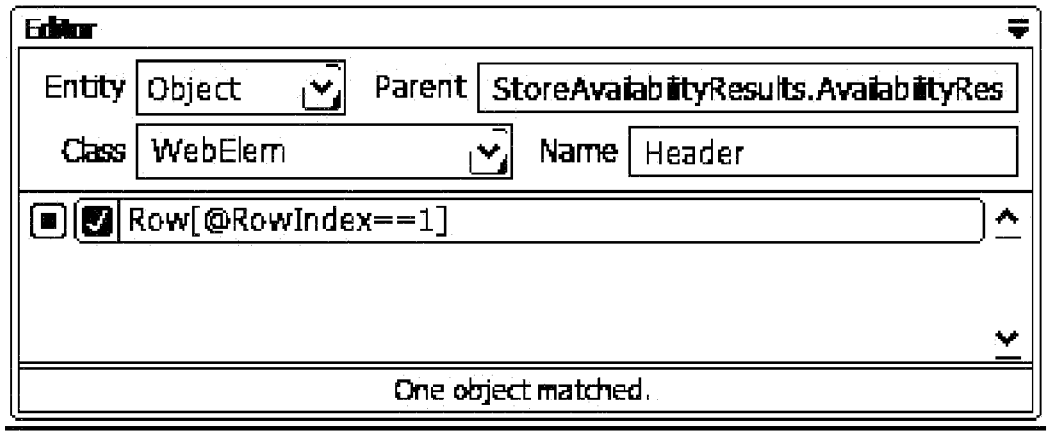

Referring to FIG. 53, another approach to defining a new table is similar to the previous but differs in one exception. The user can create a definition for the header which is typically the first row of the table. In the Editor pane, the user can select 'Object' from the Entity dropdown and then select 'WebElem' in the Class field.

The user will need to provide a name for the header in the Name field and the header row, e.g. [Row[@RowIndex==1].

Figure 54:

Referring to FIG. 54, the user then can drag the objects contained in the row to the Z pane as would any other object but being sure to nest them one level below the Header.

Figure 55:
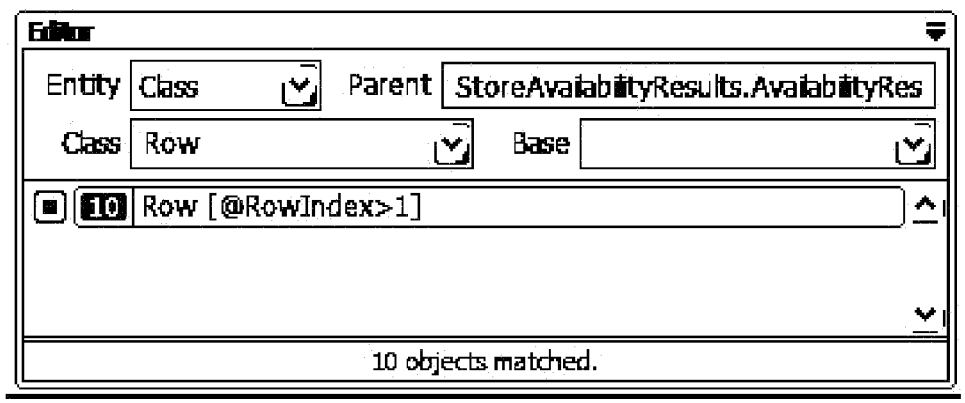

Referring to FIG. 55, the user then can create a class to represent a table row. The user can input an Entity of 'Class' and a Class of 'Row', leaving the Base field blank. Since the Header should not be included in the Table Row the user should provide a path such as [contains Row [@RowIndex>1]].

Figure 56:
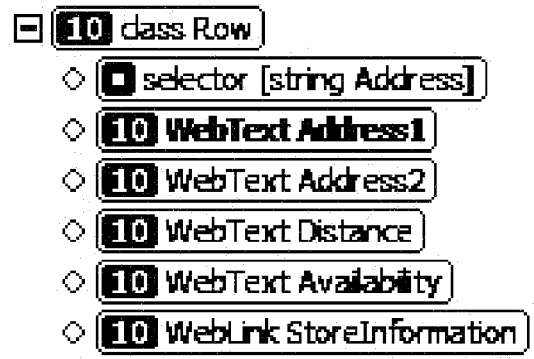

Referring to FIG. 56, the user then can drag the objects contained in the row to the Z pane as any other object, being sure to nest them one level below the class Row.

Figure 57:
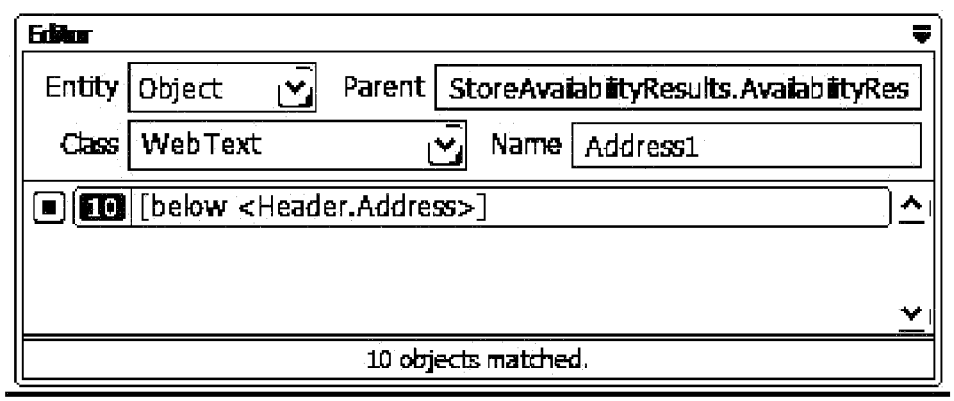

Referring to FIG. 57, the user then creates a path for the row elements using the keyword 'below' and referencing the column in the Header, e.g. [below <Header.Address>].

Figure 58:

Referring to FIG. 58, a third approach describes a method for defining a table with columns. It is also similar to the previous approaches. Once the user has defined the table and row using the steps described in Approach 1 above, the user can create an object definition for each of the columns in the table.

Figure 59:
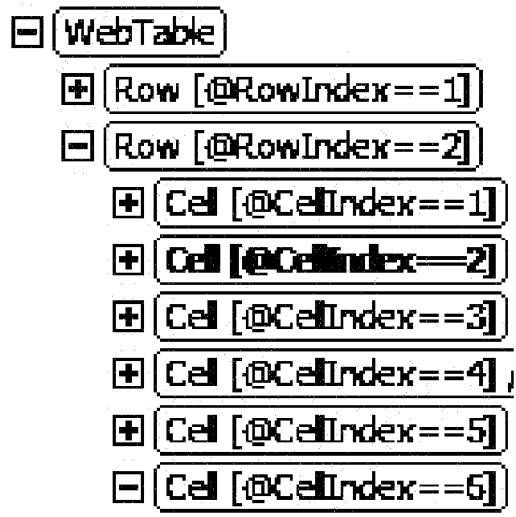

Referring to FIG. 59, a look at the Element panel provides a good understanding of how an HTML table might include Cells that can be used by the user to create columns.

Figure 60:
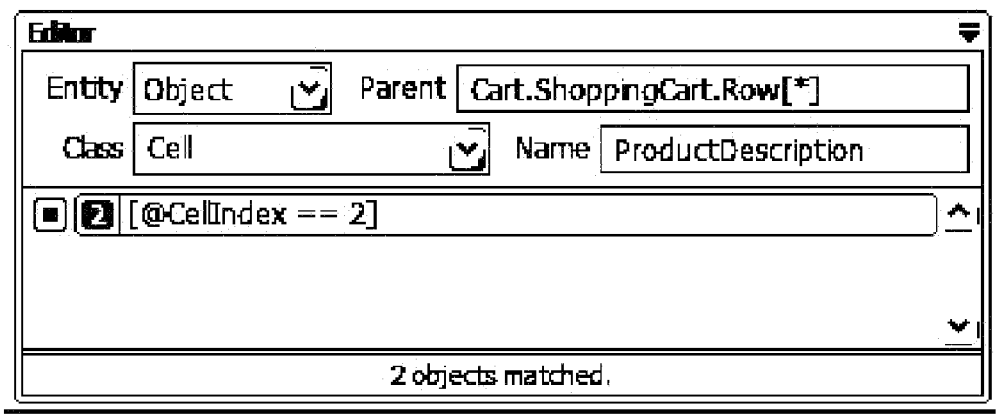

Referring to FIG. 60, each of the columns in the table will have an object defined that resembles FIG. 60. Notice the attribute @CellIndex provides a unique path for each Cell in this example.

Figure 61:
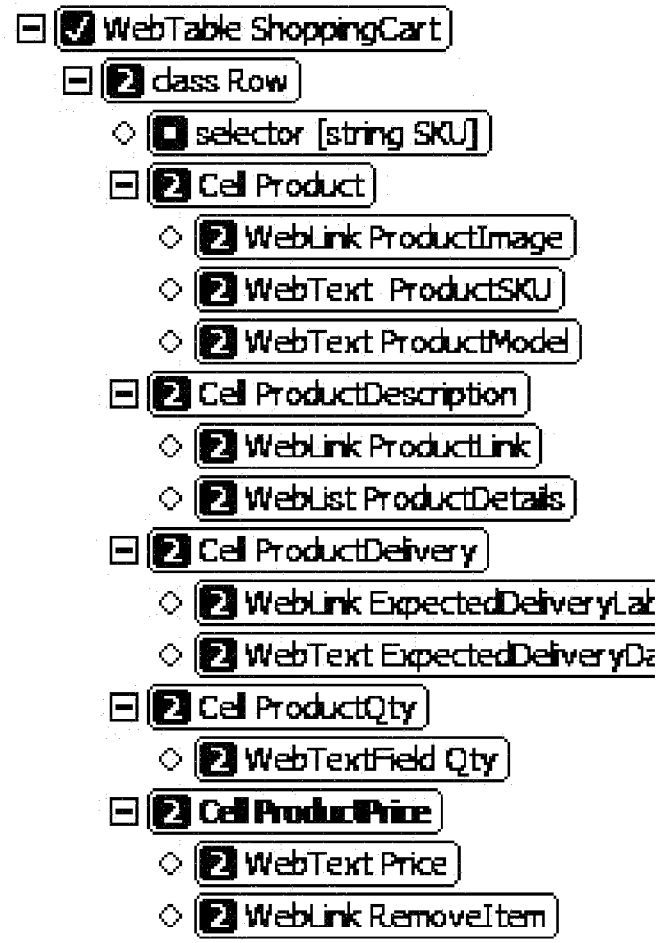

Referring to FIG. 61, once the columns have been defined, the user can drag the cell into the Z tree like any other object.

Figure 62:
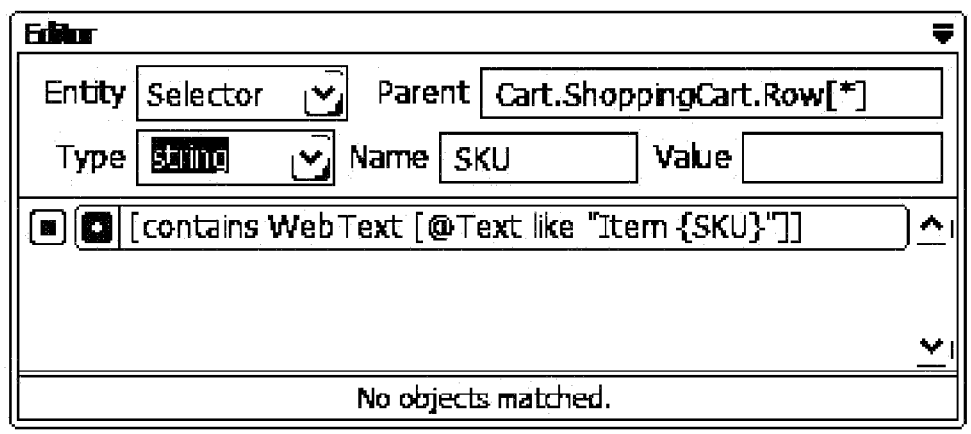

Referring to FIG. 62, place the cursor in the Z pane and hit the <Insert>key. The user can move the 'New' node to the appropriate level in the tree using the <Alt>key and the right or left arrow keys. The selector should be nested one level below the Class or Object from which items will be selected. In the Editor pane, the user can select 'Selector' from the Entity dropdown. The user then selects the type of selector from the Type field. For example if the user wanted to select with text, select 'string'. The user then provides a name for the item based upon selection. For example if the user will be using the product SKU to select the row, input 'SKU'. The user then provides a path to select the row based on the selector. For example, [contains WebText [@Text like "Item {SKU}"]].

Figure 63:
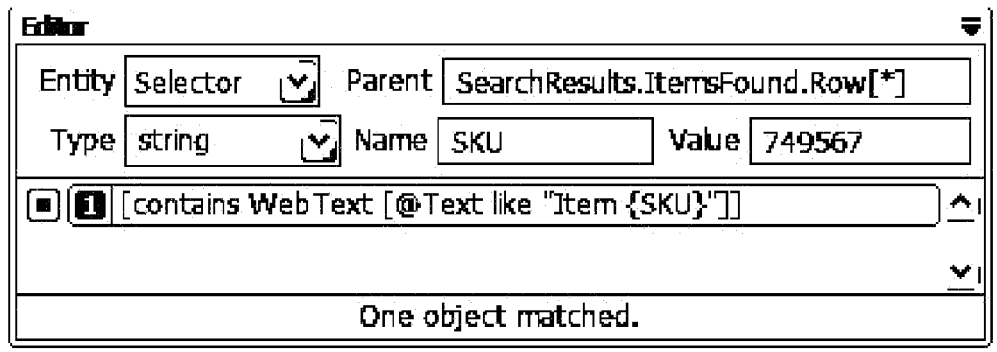

Referring to FIG. 63, to test the selector, the user can input a value for a row in the Value field. In this example the SKU 749567 is input.

Figure 64:

Referring to FIG. 64, if the selector matches a unique row in the table or list, the message "One object matched" will be displayed in the Path Editor. In addition, the number of matches will display in the Z pane before the selector.

Figure 65:

Referring to FIG. 65, elements of the class WebList can not currently be dragged from the Image panel to automatically generate Z object definitions but are possible in the Elements panel. The user can click on a WebList item in the Snapshot Image so that the element well be highlighted in the Element Tree, then the user can drag we WebList from the Element panel to the appropriate level in the Z panel. The user can then move the node to the appropriate level in the tree using the <Alt>key and the right or left arrow keys.

Figure 66:
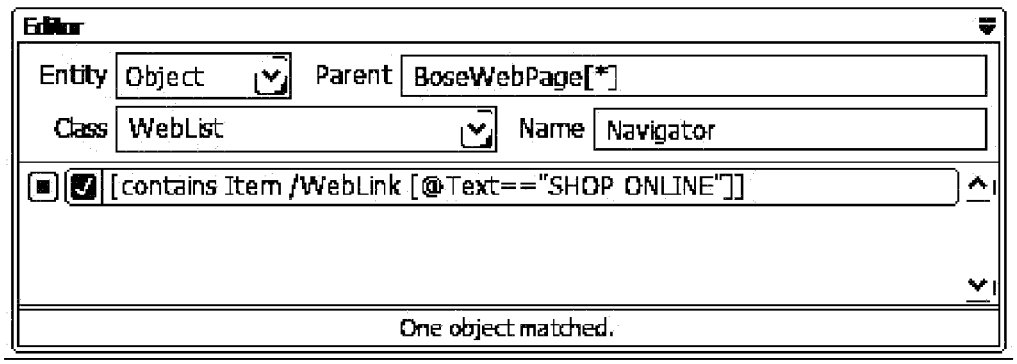

Referring to FIG. 66, in the Editor Panel, the user can select 'Object' in the Entity and 'WebList' in the Class PopupLists. The user can then provide the WebList with a name and path. In FIG. 66, the 'contains' option is used along with one of the items in the list being defined.

Figure 67:

Referring to FIG. 67, the user can drag individual items to the Z panel nested one level below the WebList defined.

Figure 68:
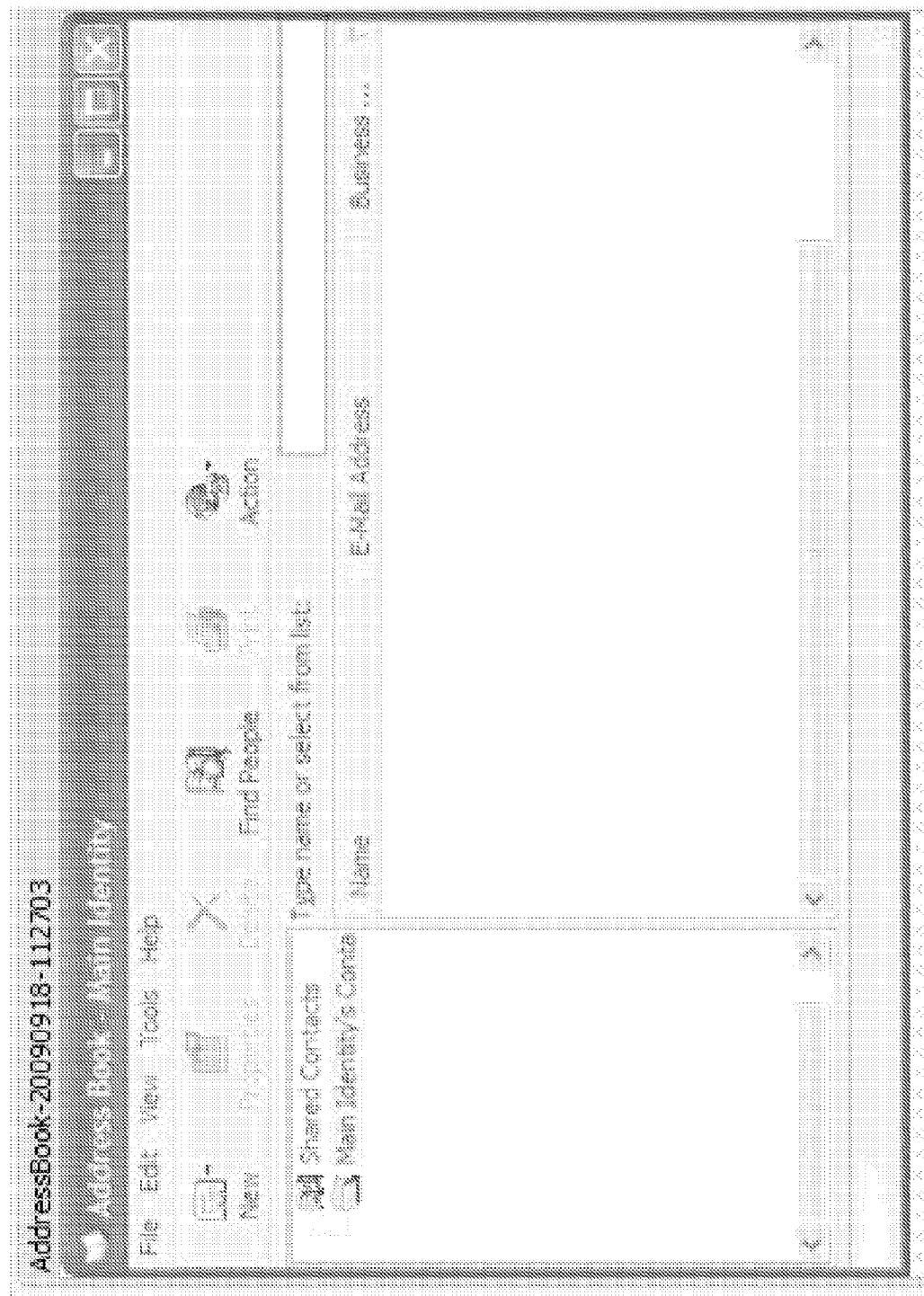

Referring to FIG. 68, the UA provides the option to declare individual objects for StatusBar segments and ToolBar buttons. Those element types can be dragged to the Z tree to automatically define objects just like any other type of element. If the user prefers to declare a StatusBar or ToolBar as a container, it can be difficult to find the drag point in the Snapshot image so that it can be dragged to the Z tree. FIG. 67 shows the user can click on one of the contained items, for example the toolbar shown, in the Snapshot image so it will be highlighted in the Element tree.

Figure 69:
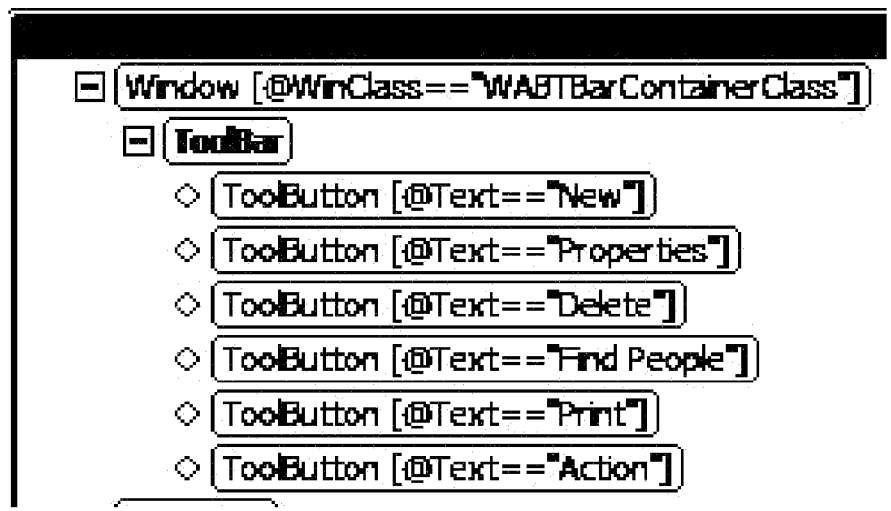

Referring to FIG. 69, the user can now locate the StatusBar or ToolBar in the Element tree and drag it to the Z tree. The user can also move the node to another appropriate level in the tree with the <Alt>and right or left arrow keys.

Figure 70:
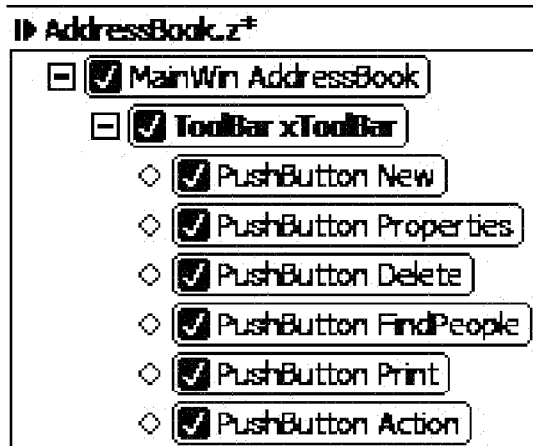

Referring to FIG. 70, the container and the items are now automatically defined. Built in selectors are already available for Status and Tool Bars so there is no need to define them.

Figure 71:
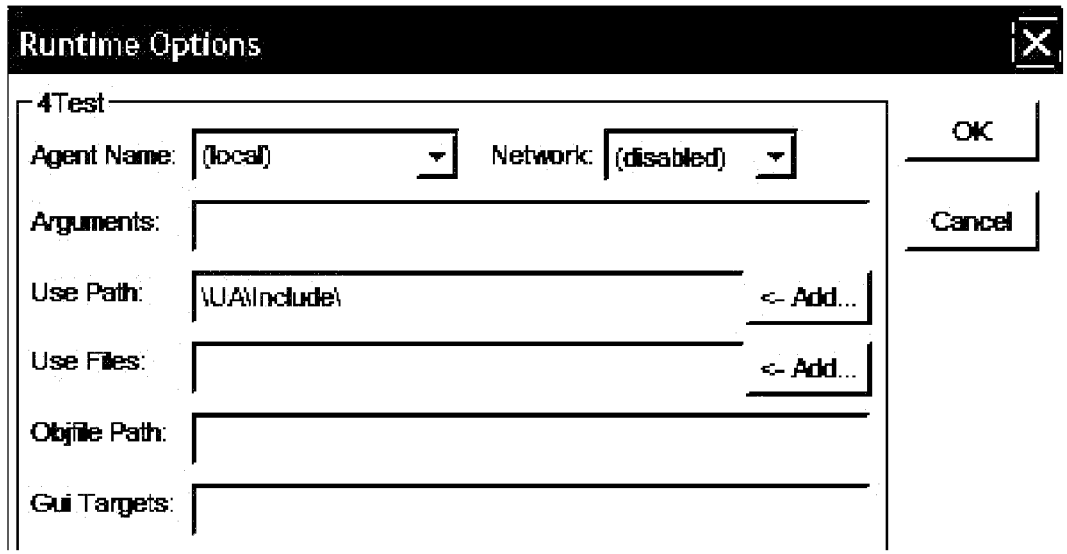

Referring to FIG. 71, to link the window declarations with the UA Class Library and other runtime files, the user can add the UA Install directory to the Use Path defined in SilkTest Runtime Options. The default path is "c:\UA\Include", although leaving out the drive specification can improve portability. FIG. 70 uses an example that the test directory is a peer to the UA installation directory.

Figure 72:

Referring to FIG. 72, showing a table row in the Items-Found table along with a Selector that takes a string as its parameter. This allows the user to use the selector in a test.

Figure 73:
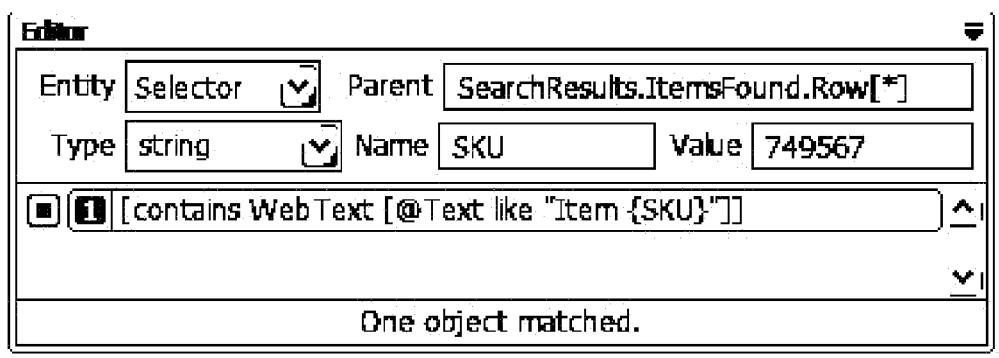

Referring to FIG. 73, pictures the UA Path Editor, with the Selector being tested with the SKU "749567".

Figure 74:
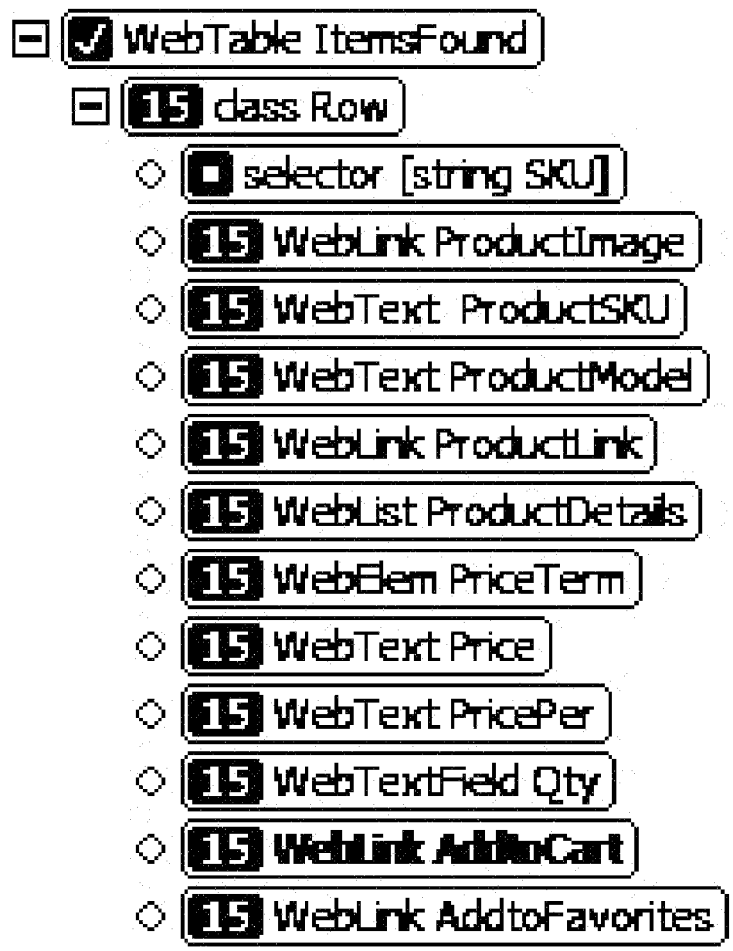

Referring to FIG. 74, the user can use the Selector for the ItemsFound table row to access any of the other items in the row. The user can use the Selector to set a value to a WebTextField by clicking Weblink or getting the value of a WebText object.

Figure 75:
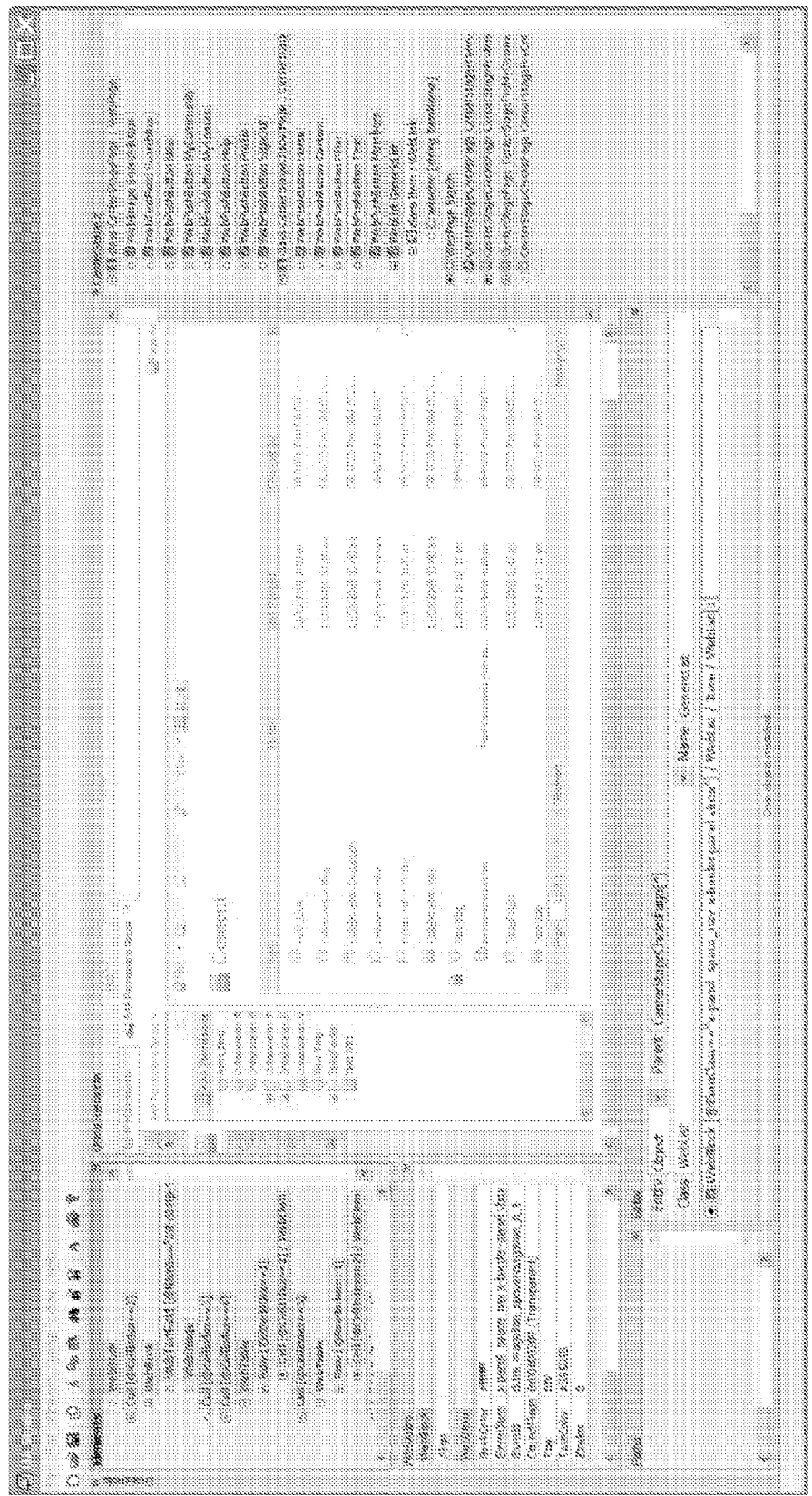

Referring to FIG. 75, object hierarchy can be used to differentiate the object that the user would like to create a path for from other objects of the same class. In this example, the path: WebBlock [@ElemClass=="x-panel space_nav x-border-panel vbox"]/WebList/Item/WebList[1] is used to form a unique path for the side panel Weblist.

Figure 76:
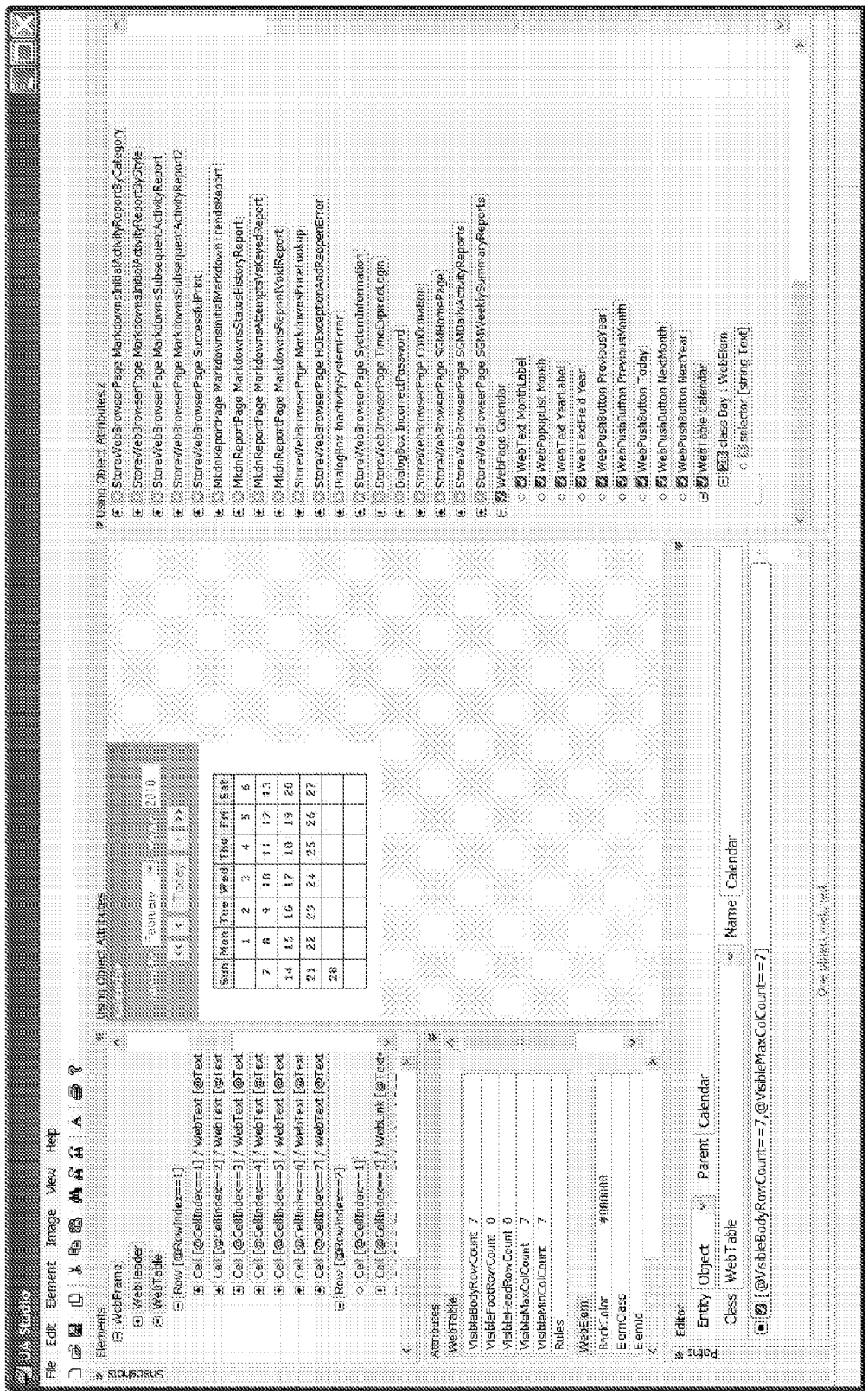

Referring to FIG. 76, object attributes provide ways to find unique paths for objects that do not have an obvious label or caption. In this example, the path: [@VisibleBodyRowCount==7,@VisibleMaxColCount==7] is used to form a unique path calendar grid.

Figure 77:
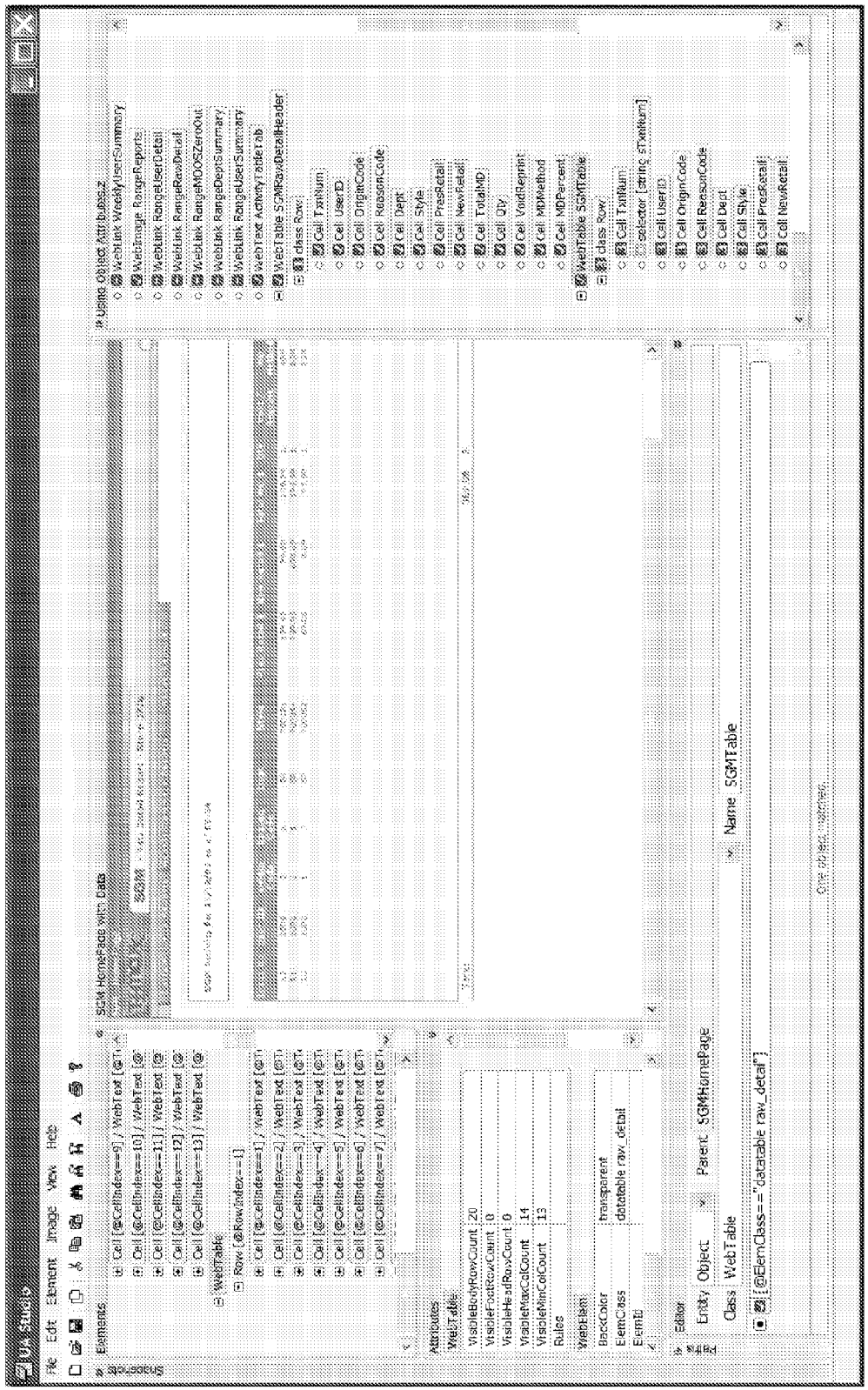

Referring to FIG. 77, some tables provide attributes that allow the header, body and footer to be easily distinguished. In this example, the path: [@ElemClass=="datatable raw detail"] is used to form a unique path body of the table.

Figure 78:
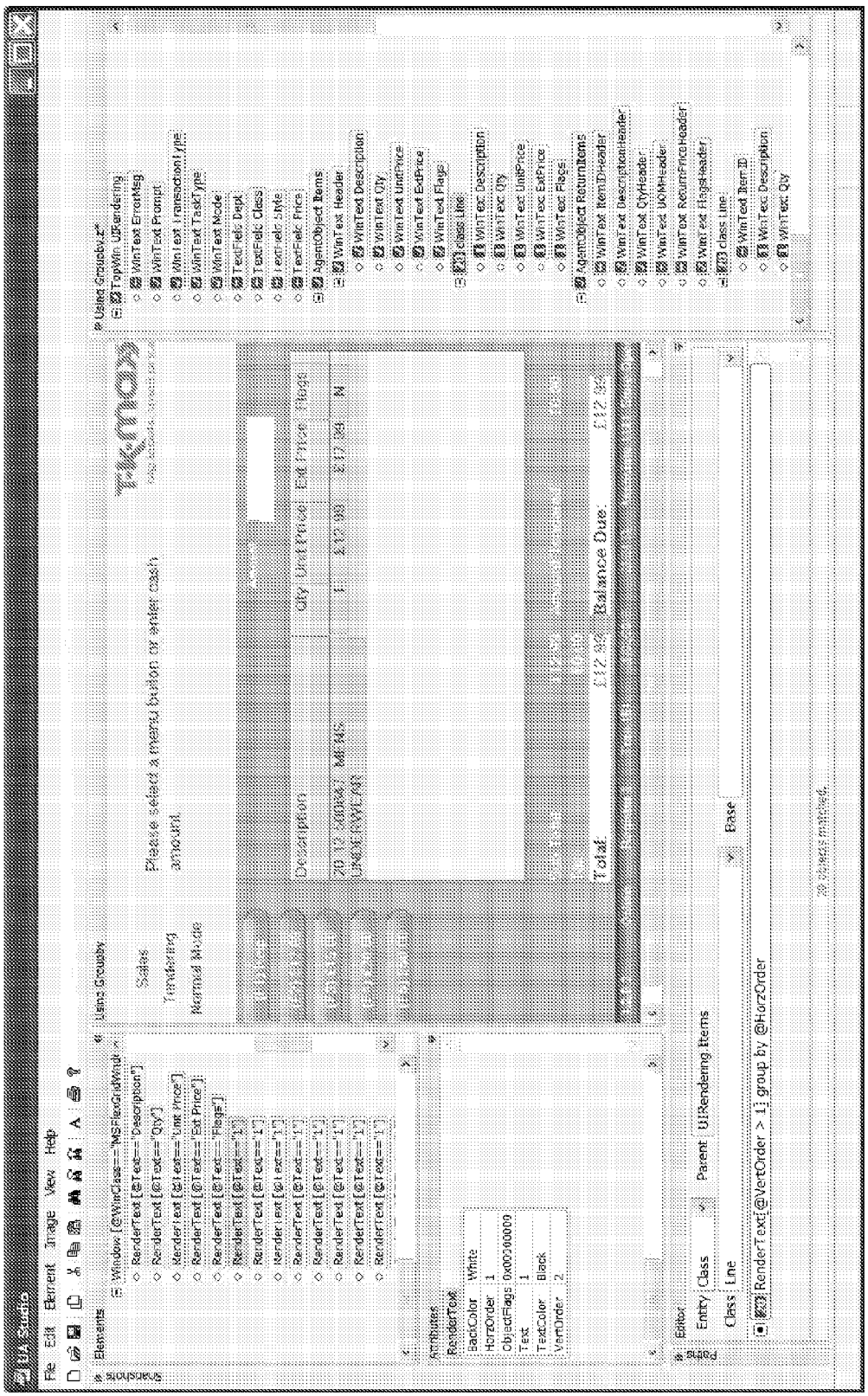

Referring to FIG. 78, the keywords 'group by' can be used to form tables from RenderText where a real table object does not exist. In this example, the path: RenderText[@VertOrder>1] group by @HorzOrder groups the RenderText objects with the same @HorzOrder attribute into a row. Once the row is formed, selectors will be available for getting the individual field values from the row.

Figure 79:
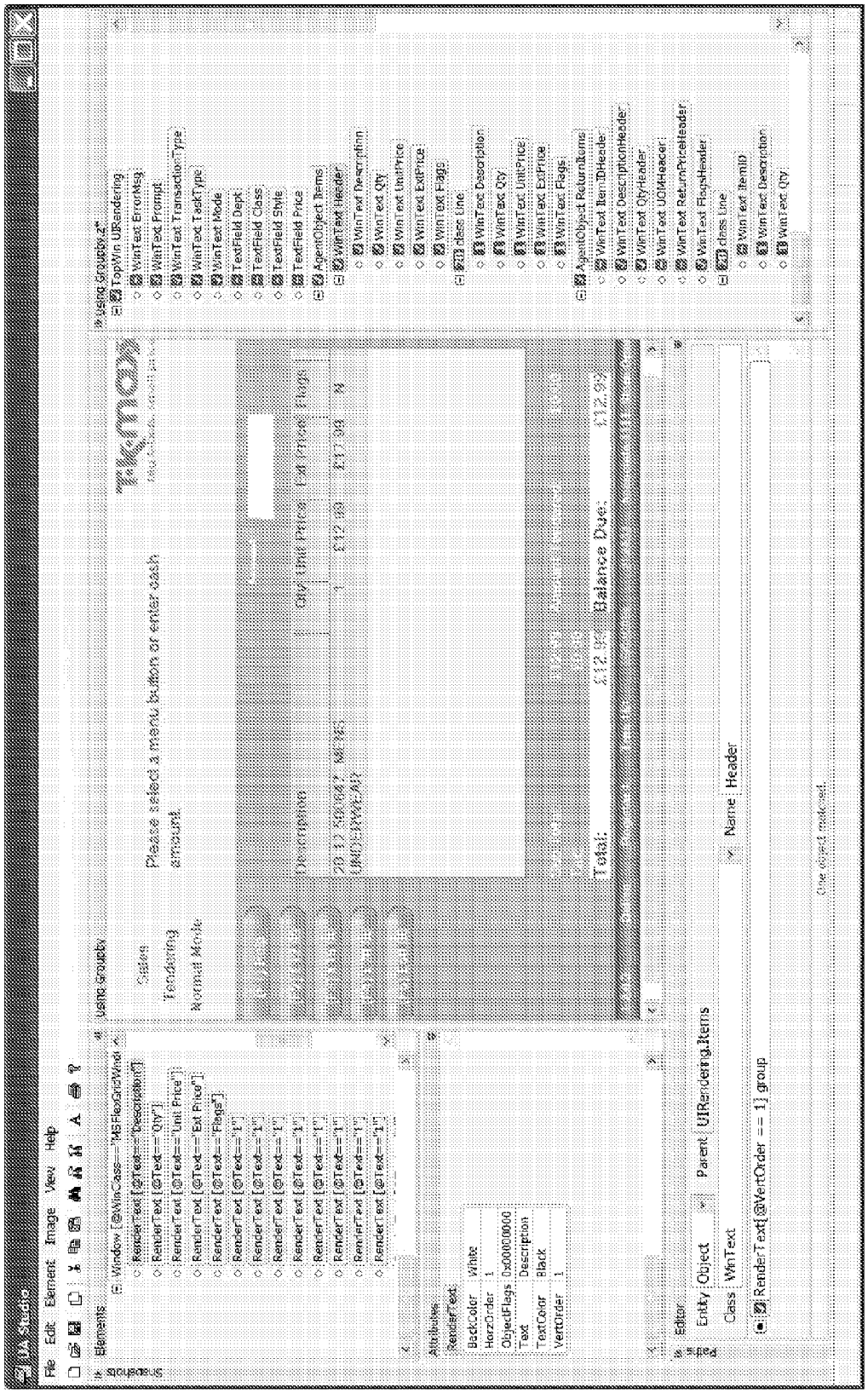

Referring to FIG. 79, the keyword 'group' can be used to form a single object where a group of objects share an attribute. In this example, the path: RenderText[@VertOrder=1] group is used to form a header so that the individual fields can be accessed as if from a collection of objects.

Figure 80:
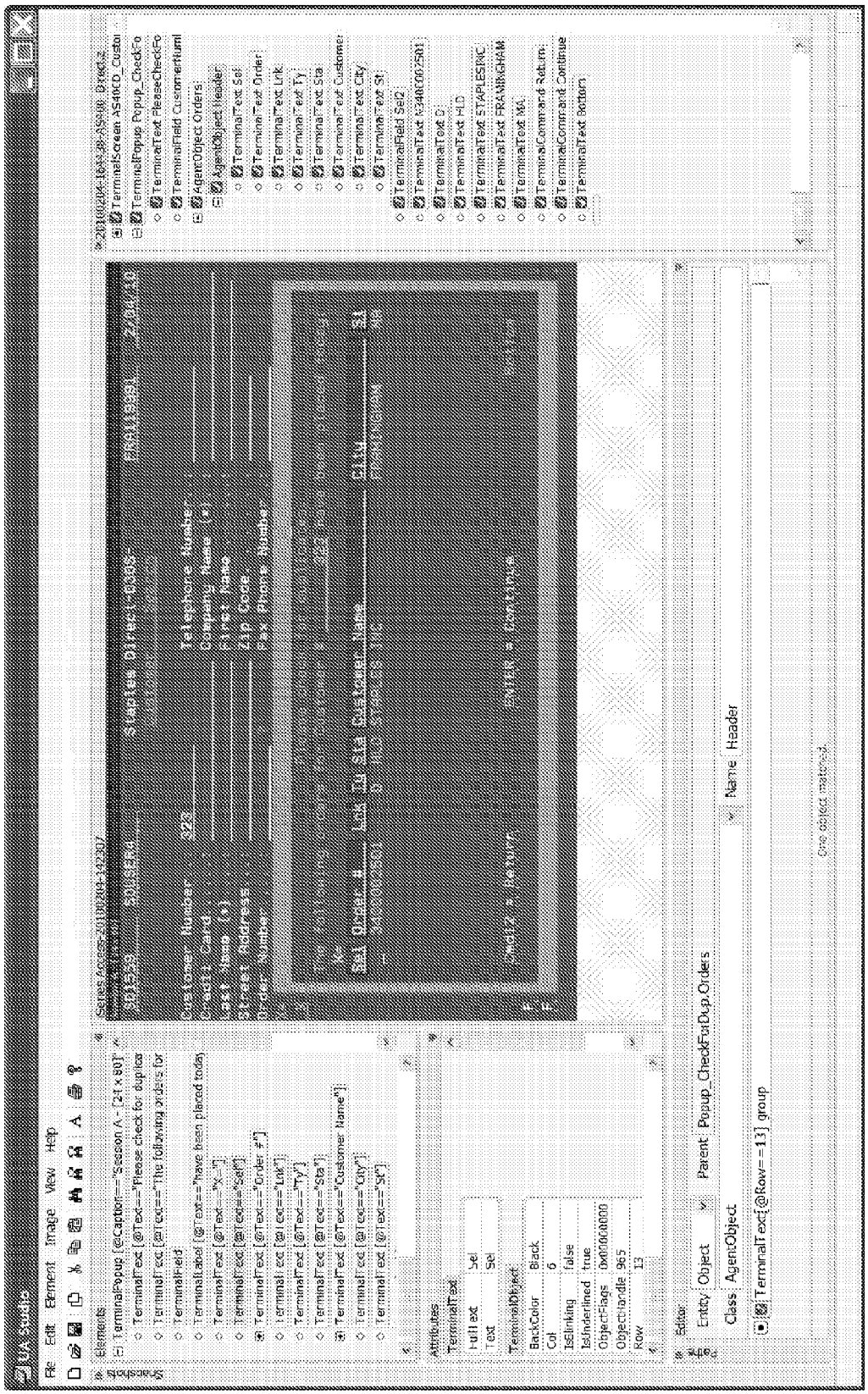

Referring to FIG. 80, the keyword 'group' can be used to form a single object where a group of objects share an attribute. This is another example of using 'group', in this case on an AS400 Terminal Screen. In this example, the path: TerminalText[@Row==13] group is used to form a header so that the individual fields can be accessed as if from a collection of objects.

Figure 81:
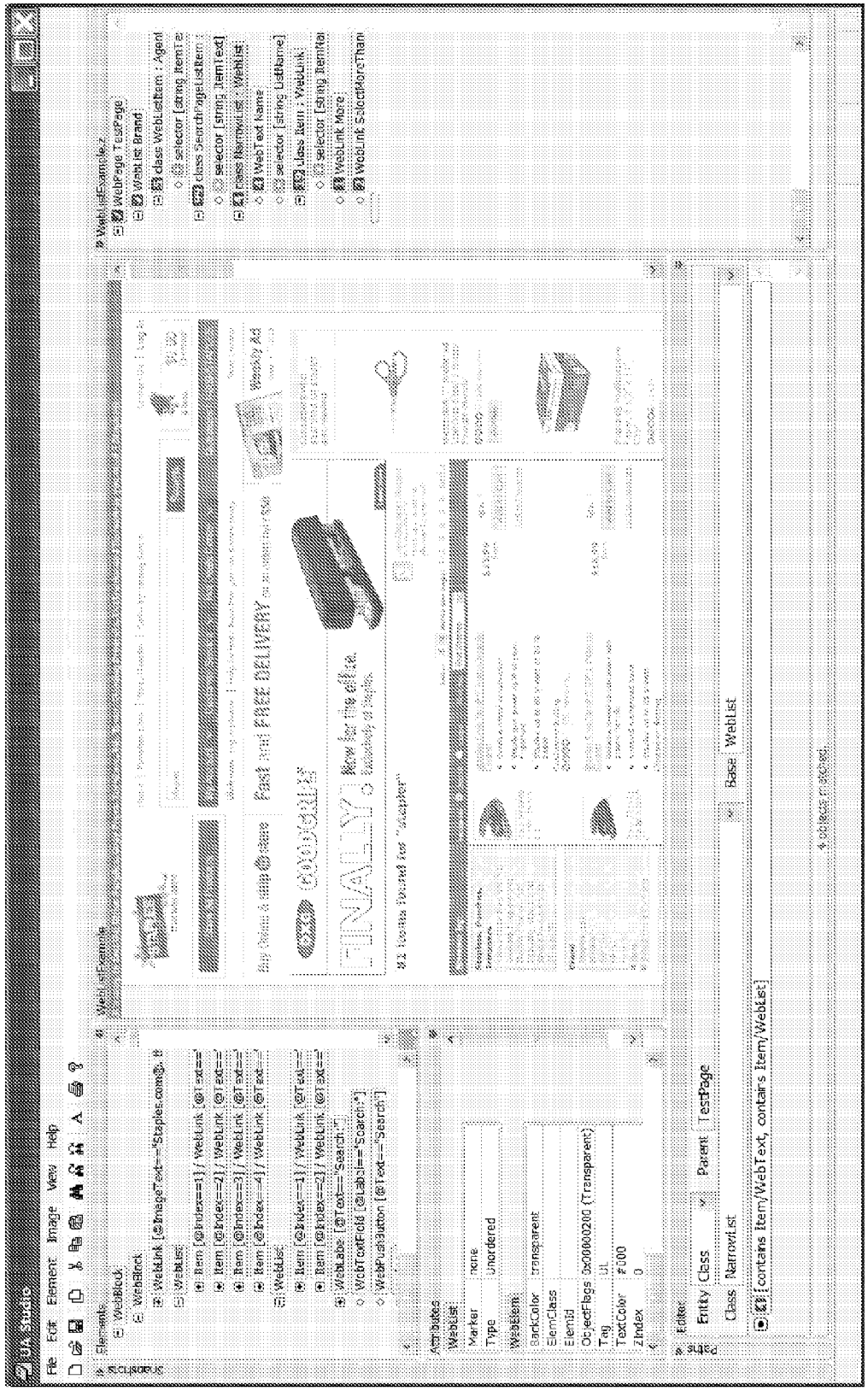

Referring to FIG. 81, it is possible to combine different ways of forming a unique path. Since the path statement supports && (or the comma) and ||, the user can combine attributes, hierarchy and other path options. FIG. 80 uses two different pieces of the hierarchy to distinguish the target WebLists in the Narrow by column from all of the other WebLists that exist on the same page.

Figure 82:
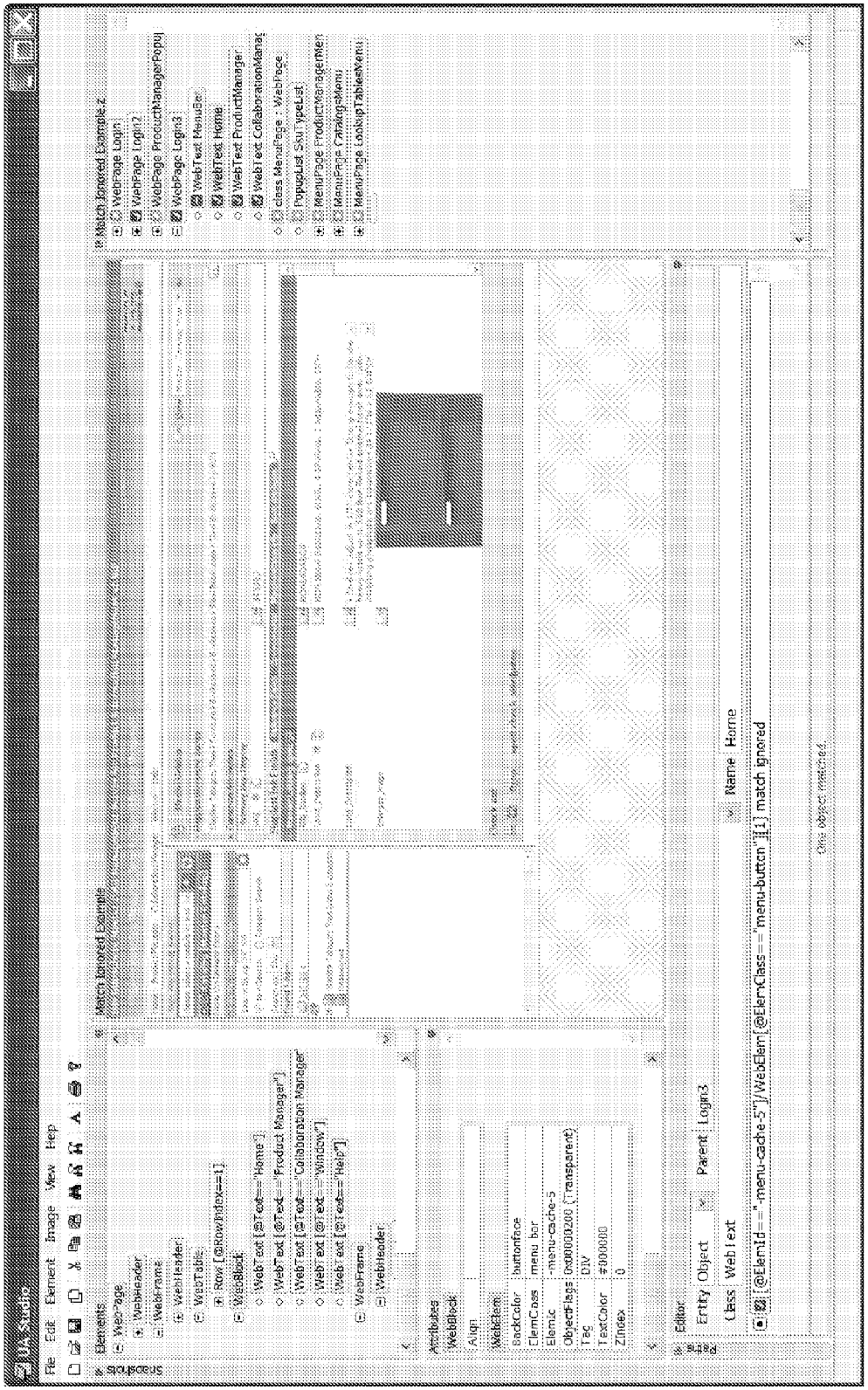

Referring to FIG. 82, the UA flattens the object hierarchy by ignoring levels that are assumed to be unnecessary. To see what levels have been ignored in the application, the user can select 'Show Ignored' from the Element menu in the UA. There are shaded objects that appear in the Elements tree. There are times when the UA ignores a level which would have helped identify an object. The keywords 'match ignored' allow the user to resolve a path for an object that has been ignored. By instructing the UA to match ignored objects, the user can use objects that had been ignored by the UA to form path statements.

Referring to FIG. 83, the UA can also provide a data design interface that organizes the data schema for the AUT into a structured display format, such as a table. This interface can be at least partially automatically populated from a snapshot of the AUT. The user can then select some of the pre-populated data, and add his or her own test data to develop a comprehensive test data set.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A computer-based software testing method, comprising: presenting to a user an interactive visual user interface of an application under test that includes a plurality of user interface controls, wherein each of tile presented user interface controls has a predefined native interaction mode,
  intercepting nonnative pointing-device-based user interaction with each of a plurality of the user interface controls, wherein the normative pointing-device-based user interaction mode is different from the native interaction mode,
  building interface definitions for the application based on results of the steps of intercepting for the plurality of interface controls, and taking a snapshot of the application in response to user input, wherein the step of presenting a visual interface presents at least part of the application snapshot, and wherein the snapshot includes the interactive visual interface presented in the step of presenting, at least a partial control set, and at least a partial set of attributes for the application.

2. The method of claim 1 wherein the step of building includes building an object definition set that includes definitions for objects underlying the plurality of user interface controls.

3. The method of claim 2 further including a step of converting the object definition set to a predefined test format for a testing application.

4. The method of claim 2 further including a step of presenting to the user a class definition control that is responsive to user input to create object classes for classifying object definitions underlying the plurality of user interface controls.

5. The method of claim 2 further including a step of detecting duplicate user interface object nomenclature within the objects underlying the user interface controls presented in the step of presenting.

6. The method of claim 2 wherein the step of testing includes providing a measure of path quality to the user.

7. The method of claim 1 further including a step of presenting to the user a hierarchical object definition view that presents object definitions that underlie at least some of the user interface controls and presents relationships between the objects in the hierarchical object definition view.

8. The method of claim 7 further including presenting attributes of selected objects in the hierarchical object definition view.

9. The method of claim 1 further including a step of presenting a hierarchical user interface control view that lists at least some of the user interface controls presented in the step of presenting an interactive user interface and presents relationships between the controls in the hierarchical user interface control view.

10. The method of claim 1 wherein the step of building includes building at least one data schema for the application under test.

11. The method of claim 10 further including a step of presenting to the user a schema-based visual data organization tool that is populated with at least some object attributes acquired from the application under test.

12. The method of claim 11 wherein the step of presenting to the user a schema-based visual data organization tool provides a selection interface to select one or more of the acquired object attributes for a test case.

13. The method of claim 1 wherein the step of building includes binding entries in the schema to entries in the object definition list.

14. The method of claim 1 further including presenting a set of paths for objects underlying the user interface controls selected by the user interaction with the user interface controls.

15. The method of claim 14 further including providing a path editor operative to allow user modification of the paths.

16. The method of claim 15 wherein the path editor is operative to create nested Boolean path statements.

17. The method of claim 14 wherein the step of presenting a set of paths includes presenting the set of paths as part of a hierarchical object view that presents definitions for objects that underlie the plurality of user interface controls.

18. The method of claim 1 further including a step of automatically extracting object definitions from the application under test and presenting to the user an organized set of object definitions for the application under test.

19. The method of claim 18 wherein the steps of presenting a visual user interface and presenting an organized set of object definitions present their results simultaneously in different display areas.

20. The method of claim 19 further including a step of presenting visual cues between user interface controls presented in the step of presenting an interactive visual user interface and object definitions presented in the organized set.

21. The method of claim 1 wherein the step of intercepting intercepts drag-and-drop interactions with the controls.

22. The method of claim 1 further including a step of automatically testing results of the step of intercepting for different types of controls based on different predetermined rules.

23. The method of claim 1 further including a step of providing selectors to the user for accessing sub-controls of list-based controls.

24. The method of claim 23 wherein the step of providing selectors provides selectors that are operative to access cells of table controls.

25. The method of claim 1 wherein the step of intercepting intercepts selections of a group of controls and wherein the step of building builds a logical object comprising the selected controls in the group.

26. A computer-based software testing method, comprising: presenting to a user an interactive visual user interface of an application under test that includes a plurality of user interface controls, wherein each of the presented user interface controls has a predefined native interaction mode,
  intercepting nonnative pointing-device-based user interaction with each of a plurality the user interface controls, wherein the normative pointing-device-based user interaction mode is different from the native interaction mode, and
  building interface definitions for the application based on results of the steps of intercepting for the plurality of interface controls, wherein the step of building includes building an object definition set that includes definitions for objects underlying the plurality of user interface controls, wherein the object definitions each include at least a token that uniquely identifies the object and wherein the nonnative interaction mode differs from the native interaction mode by virtue of the user interface elements being deactivated in the step of presenting.

27. The method of claim 26 wherein the step of building includes building an object definition set that includes definitions for objects underlying the plurality of user interface controls.

28. The method of claim 26 further including a step of presenting to the user a hierarchical object definition view that presents object definitions that underlie at least some of the user interface controls and presents relationships between the objects in the hierarchical object definition view.

29. The method of claim 28 further including presenting attributes of selected objects in the hierarchical object definition view.

30. The method of claim 26 further including a step of presenting a hierarchical user interface control view that lists at least some of the user interface controls presented in the step of presenting an interactive user interface and presents relationships between the controls in the hierarchical user interface control view.

31. The method of claim 26 further including presenting a set of paths for objects underlying the user interface controls selected by the user interaction with the user interface controls, providing a path editor operative to allow user modification of the paths, and wherein the path editor is operative to create nested Boolean path statements.

32. The method of claim 26 further including presenting a set of paths for objects underlying the user interface controls selected by the user interaction with the user interface controls and wherein the step of presenting a set of paths includes presenting the set of paths as part of a hierarchical object view that presents definitions for objects that underlie the plurality of user interface controls.

33. The method of claim 26 further including a step of automatically extracting object definitions from the application under test and presenting to the user an organized set of object definitions for the application under test.

34. The method of claim 26 wherein the step of intercepting intercepts drag-and-drop interactions with the controls.

35. The method of claim 26 further including a step of providing selectors to the user for accessing sub-controls of list-based controls.

36. The method of claim 35 wherein the step of providing selectors provides selectors that are operative to access cells of table controls.

37. A software testing system comprising:
a processor,
a storage device including instructions that are configured to run on the processor,
snapshot acquisition logic responsive to user input to acquire a snapshot of a user interface of an application under test that includes least a partial set of user interface controls for the application and a partial set of attributes for the application,
an application under test user interface presentation area for visually presenting the user interface snapshot of the application under test that includes the partial set of user interface controls and the partial set of attributes, wherein each of the presented user interface controls includes a native interaction mode,
interactive control logic responsive to nonnative pointing-device-based user interaction with each of partial set of the user interface controls, wherein the nonnative interaction mode is different from the native interaction mode, and
an interface definition authoring area that is also responsive to the nonnative pointing-device-based user interaction to define associations between the user interface controls and interface definitions.

38. A computer-based software testing method, comprising:
taking a snapshot of an application under test in response to user input, wherein the snapshot includes at least a partial control set, and at least a partial set of attributes for the application under test,
presenting to a user the snapshot of the application under test, wherein the step of presenting presents one or more list-based interface controls that each include a plurality of sub-controls,
receiving a selector definition identifying one of the list-based user interface controls, and
defining a selector, based on the received selector definition, that relates selection input to one of the sub-controls of the identified list-based interface control.

39. The method of claim 38 wherein the step of defining defines a selector that is responsive to the selection input in the form of a search string and is operative to search for the search string in sub-controls in the identified list-based interface control during a test of the application under test.

40. The method of claim 38 wherein the step of defining defines a selector that is responsive to the selection input in the form of an index and is operative to locate a sub-control of the identified list-based interface control during a test of the application under test using the index.

41. A computer-based software testing method, comprising:
taking a snapshot of an application under test in response to user input, wherein the snapshot includes at least a partial set of user interface controls, and at least a partial set of attributes for the application under test,
presenting to a user the snapshot including a plurality of the user interface controls for an application under test,
building interface definitions for at least some of the interface controls,
receiving a group selection identifying a plurality of the user interface controls, and
defining a logical object definition that groups definitions for the selected plurality of user interface controls.

42. The method of claim 41 wherein the logical object definition is structured to allow selection of one of the grouped user interface control definitions via an index.

43. The method of claim 41 wherein the logical object definition is structured to allow selection of one of the grouped user interface control definitions via a search string.

* * * * *